(12) United States Patent
Yang et al.

(10) Patent No.: US 11,337,040 B2
(45) Date of Patent: *May 17, 2022

(54) BROADCAST BEARER MANAGEMENT METHOD AND DEVICE THEREOF

(71) Applicant: HUAWEI TECHNOLOGIES CO., LTD., Guangdong (CN)

(72) Inventors: Yanmei Yang, Beijing (CN); Cuili Ge, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,177

(22) Filed: Aug. 7, 2020

(65) Prior Publication Data
US 2020/0374663 A1    Nov. 26, 2020

Related U.S. Application Data

(63) Continuation of application No. 16/371,778, filed on Apr. 1, 2019, now Pat. No. 10,757,542, which is a
(Continued)

(51) Int. Cl.
*H04W 4/08* (2009.01)
*H04W 4/10* (2009.01)
(Continued)

(52) U.S. Cl.
CPC .............. *H04W 4/08* (2013.01); *H04W 4/02* (2013.01); *H04W 4/10* (2013.01); *H04W 4/12* (2013.01);
(Continued)

(58) Field of Classification Search
CPC ........... H04W 4/02; H04W 4/06; H04W 4/08; H04W 4/10; H04W 4/12; H04W 76/45; H04W 88/02
(Continued)

(56) References Cited

U.S. PATENT DOCUMENTS 8,811,180 B2 *  8/2014  Ozawa .................. H04L 1/0009
                                                      370/236
10,757,542 B2 *  8/2020  Yang ...................... H04W 76/45
(Continued)

FOREIGN PATENT DOCUMENTS

CN          101136814 A          3/2008
CN          101800938 A          8/2010
(Continued)

OTHER PUBLICATIONS

3GPP TS 23.468 V13.3.0 (Dec. 2015), 3rd Generation Partnership Project; Technical Specification Group Services and System Aspects; Group Communication System Enablers for LTE (GCSE_LTE); Stage 2 (Release 13), 3GPP Technical Specification, Dec. 2015, 30 pages.
(Continued)

*Primary Examiner* — Tan H Trinh
(74) *Attorney, Agent, or Firm* — Fish & Richardson P.C.

(57) ABSTRACT

The present application relates to broadcast bearer management methods and devices. One example method includes receiving, by a first bearer management server (BMS), a first message sent by a service server, where the first message includes a group identifier of a service group, determining, by the first BMS, a first broadcast bearer for the service group based on the first message, and sending, by the first BMS, a second message to the service server, where the second message carries user plane information of the first broadcast bearer.

20 Claims, 15 Drawing Sheets

Related U.S. Application Data continuation of application No. PCT/CN2016/101417, filed on Oct. 1, 2016.

(51) Int. Cl.

| | | |
|---|---|---|
| *H04W 76/45* | (2018.01) | |
| *H04W 4/02* | (2018.01) | |
| *H04W 4/12* | (2009.01) | |
| *H04W 88/02* | (2009.01) | |
| *H04W 4/06* | (2009.01) | |

(52) U.S. Cl.
CPC .......... *H04W 76/45* (2018.02); *H04W 88/02* (2013.01); *H04W 4/06* (2013.01)

(58) Field of Classification Search
USPC .......................... 370/236, 312, 337; 709/219
See application file for complete search history.

(56) References Cited

U.S. PATENT DOCUMENTS

| | | | |
|---|---|---|---|
| 2003/0063591 A1 | 4/2003 | Leung et al. | |
| 2003/0086423 A1 | 5/2003 | Hsu | |
| 2006/0104225 A1 | 5/2006 | Kim et al. | |
| 2006/0109812 A1 | 5/2006 | Kim et al. | |
| 2010/0077088 A1 | 3/2010 | Hyun et al. | |
| 2011/0317672 A1* | 12/2011 | Inatomi | H04W 12/06 370/337 |
| 2012/0170502 A1 | 7/2012 | Korus et al. | |
| 2013/0064160 A1* | 3/2013 | Newberg | H04W 76/40 370/312 |
| 2015/0229677 A1* | 8/2015 | Gu | H04L 65/103 709/219 |
| 2016/0234806 A1 | 8/2016 | Dennequin et al. | |
| 2017/0339723 A1 | 11/2017 | Fujishiro et al. | |
| 2018/0034861 A1 | 2/2018 | Gu et al. | |
| 2018/0123812 A1* | 5/2018 | Hu | H04L 12/185 |
| 2019/0208359 A1 | 7/2019 | Baek et al. | |

FOREIGN PATENT DOCUMENTS

| | | | |
|---|---|---|---|
| CN | 101883327 A | 11/2010 | |
| CN | 102595328 A | 7/2012 | |
| CN | 103036926 A | 4/2013 | |
| CN | 103581836 A | 2/2014 | |
| CN | 103609147 A | 2/2014 | |
| CN | 104254054 A | 12/2014 | |
| CN | 104284298 A | 1/2015 | |
| CN | 105323722 A | 2/2016 | |
| CN | 105323723 A | 2/2016 | |
| CN | 105376717 A | 3/2016 | |
| WO | 2009121406 A1 | 10/2009 | |
| WO | 2015111974 A2 | 7/2015 | |
| WO | 2016026798 A1 | 2/2016 | |
| WO | 2016142810 A1 | 9/2016 | |
| WO | WO-2016142810 A1 * | 9/2016 | H04L 12/1845 |

OTHER PUBLICATIONS

Extended European Search Report issued in European Application No. 16917442.2 dated Jul. 19, 2019, 7 pages.

Office Action issued in Chinese Application No. 201680089442.5 dated Dec. 24, 2019, 6 pages.

PCT International Search Report and Written Opinion issued in International Application No. PCT/CN2016/101417 dated Jun. 23, 2017, 19 pages (with English translation).

Office Action issued in Chinese Application No. 20201 1617653.6 dated Jan. 29, 2022.

* cited by examiner

BROADCAST BEARER MANAGEMENT METHOD AND DEVICE THEREOF

CROSS-REFERENCE TO RELATED APPLICATIONS

This application is a continuation of U.S. patent application Ser. No. 16/371,778, filed on Apr. 1, 2019, which is a continuation of International Patent Application No. PCT/CN2016/101417, filed Oct. 1, 2016. All of the afore-mentioned patent applications are hereby incorporated by reference in their entireties.

TECHNICAL FIELD

The present application relates to the field of communications networks, and in particular, to a multimedia broadcast/multicast service (MBMS) bearer management method and a device thereof.

BACKGROUND

Existing mission critical push-to-talk over LTE is applied to public safety applications and general commercial applications, for example, public utilities or railway applications, and supports 1-to-N group communication. For 1-to-N group communication, a mission critical push-to-talk (MCPTT) system supports two media transmission modes: unicast transmission and MBMS broadcast transmission. For the MBMS broadcast transmission mode, a network architecture in which the MCPTT system is based on Group Communication System Enablers (GCSE_LTE) is shown in FIG. 1. A mission critical service server (MCS server) is an example of a GCS AS and implements management and use of broadcast bearers. An existing MCPTT server is a type of an MCS server and integrates a group communication system application server (GCS AS) function, as shown in FIG. 2. FIG. 2 shows an architecture and a function model of an MCPTT network.

An increasing quantity of services are introduced in the public safety field. To adapt to and satisfy requirements of group communication such as MCVideo and MCData, broadcast bearers need to be used to broadcast media data. A broadcast bearer service is an underlying transmission service irrelevant to a specific application layer service. In the prior art, a GCS AS function responsible for managing and using a broadcast bearer service is bound to an application layer service server, for example, an MCPTT server. In this way, each time a new service that needs to use a broadcast bearer service is introduced, the GCS AS function needs to be implemented again. As a result, an entire public safety network architecture has repetitive and coupled functions, and fast deployment of new services is hindered. Moreover, if a plurality of emergency services are configured in one group, because servers are deployed separately, it cannot be ensured that a same broadcast bearer is used for transmission for all services in a same group. There are two existing types of broadcast bearers for distributing downlink media data; a pre-established broadcast bearer and a dynamically established broadcast bearer. It should be noted that the pre-established broadcast bearer is established before a service group session is established, and the dynamically established broadcast bearer is established after a service group session is established, as shown in FIG. 3 and FIG. 4.

FIG. 3 is a flowchart of a method for pre-establishing a broadcast bearer based on an MCPTT architecture. FIG. 4 is a flowchart of a method for dynamically establishing a broadcast bearer based on an MCPTT architecture. In a process of pre-establishing or dynamically establishing a broadcast bearer based on the MCPTT architecture in FIG. 3 and FIG. 4, activation, management, and call control of the broadcast bearer are tightly coupled in an MCPTT server, resulting in relatively low efficiency of using broadcast bearer resources. A plurality of MCPTT servers may provide services in one MCPTT system, and the MCPTT servers (or GCS ASs) need to determine, based on group members that participate in a group call, whether a broadcast bearer needs to be used. In an existing MCPTT architecture, each MCPTT server manages and uses a broadcast bearer independently, and there is no system-level node that centrally controls broadcast bearers.

SUMMARY

The present application provides a broadcast bearer management method and a device thereof, to decouple a broadcast bearer management function from an application service layer control function.

According to a first aspect, an embodiment of the present application provides a broadcast bearer management method, where the method includes:

receiving, by a first bearer management server BMS, a first message sent by a service server, where the first message includes a group identifier of a service group;

determining, by the first BMS, a first broadcast bearer for the service group based on the first message; and sending, by the first BMS, a second message to the service server, where the second message carries user plane information of the first broadcast bearer.

The first message sent by the service server is received, a usable broadcast bearer is determined for the service group based on the group identifier of the service group included in the first message, and the user plane information of the determined broadcast bearer is added to the second message and sent to the service server, so that the service server can use the broadcast bearer to transmit data for the group. A broadcast bearer management function is decoupled from an application service layer control function. In addition, compared with the prior art, broadcast bearers are centrally managed and used at one control point, so that the broadcast bearers are centrally scheduled.

In a design solution of the present application, the first BMS sends transmission mode indication information to the service server, where the transmission mode indication information may also be referred to as indication information. In this embodiment of the present application, a name of the indication information is not limited, and the indication information is used to instruct the service server to transmit data to the service group by using a transmission mode determined by the first BMS.

In a design solution, the transmission mode indication information is used to instruct the service server to use a broadcast transmission mode for the service group; or the transmission mode indication information is used to instruct the service server to use a broadcast transmission mode or use a unicast transmission mode for all members or some members in the service group; or the transmission mode indication information is used to instruct the service server to switch from a unicast transmission mode to a broadcast transmission mode or switch from a broadcast transmission mode to a unicast transmission mode or use only a unicast transmission mode or use only a broadcast transmission mode or stop using a unicast transmission mode or stop using a broadcast transmission mode for the service group.

In a design solution, the second message includes the transmission mode indication information.

With reference to the first aspect, in a first possible implementation of the first aspect, determining, by the first BMS, a first broadcast bearer for the service group based on the first message includes:

obtaining, by the first BMS, reception status information of at least one broadcast bearer sent by at least one terminal; and determining, by the first BMS, the first broadcast bearer for the service group based on the first message and the reception status information of the at least one broadcast bearer sent by the at least one terminal.

With reference to the first possible implementation of the first aspect, in a second possible implementation of the first aspect, the first message further includes service description information, and determining, by the first BMS, the first broadcast bearer for the service group based on the first message and the reception status information of the at least one broadcast bearer sent by the at least one terminal includes:

determining the first broadcast bearer for the service group if the at least one broadcast bearer satisfies the service description information and the reception status information of the at least one broadcast bearer sent by the at least one terminal satisfies a first preset condition.

With reference to the first aspect, in a third possible implementation of the first aspect, determining, by the first BMS, a first broadcast bearer for the service group based on the first message includes:

establishing, by the first BMS, the first broadcast bearer based on the first message;

sending, by the first BMS, a broadcast bearer announcement message to at least one terminal, where the broadcast bearer announcement message carries bearer information of the first broadcast bearer;

receiving, by the first BMS, reception status information of the first broadcast bearer sent by the at least one terminal; and if the reception status information of the first broadcast bearer sent by the at least one terminal satisfies a first preset condition, determining the first broadcast bearer for the service group.

With reference to the third possible implementation of the first aspect, in a fourth possible implementation of the first aspect, before establishing, by the first BMS, the first broadcast bearer based on the first message, the method further includes:

obtaining, by the first BMS, reception status information of at least one broadcast bearer sent by the at least one terminal; and if the reception status information of the at least one broadcast bearer sent by the at least one terminal does not satisfy the first preset condition, establishing, by the first BMS, the first broadcast bearer based on the first message.

With reference to the third possible implementation of the first aspect, in a fifth possible implementation of the first aspect, the first message includes service description information, and establishing, by the first BMS, the first broadcast bearer based on the first message includes:

if the service description information does not satisfy a second preset condition, establishing, by the first BMS, the first broadcast bearer based on the first message.

With reference to the fifth possible implementation of the first aspect, in a sixth possible implementation of the first aspect, establishing, by the first BMS, the first broadcast bearer based on the first message includes:

obtaining, by the first BMS, location information of a terminal in the service group; and establishing, by the first BMS, the first broadcast bearer based on the service description information and the location information of the terminal in the service group.

With reference to the sixth possible implementation of the first aspect, in a seventh possible implementation of the first aspect, obtaining, by the first BMS, location information of the terminal in the service group includes:

obtaining, by the first BMS, the location information of the terminal in the service group from at least one of the service server, a group management server, a terminal location management server, and a second BMS; or receiving, by the first BMS, the location information sent by the terminal in the service group.

With reference to the seventh possible implementation of the first aspect, in an eighth possible implementation of the first aspect, after sending, by the first BMS, a second message to the service server, the method further includes:

sending, by the first BMS, a broadcast bearer synchronization message to the second BMS, where the broadcast bearer synchronization message includes the bearer information and the user plane information of the first broadcast bearer.

In a design solution, the broadcast bearer synchronization message further includes the group identifier.

With reference to the first aspect, in a ninth possible implementation of the first aspect, the method further includes:

receiving, by the first BMS, reception status information of the first broadcast bearer sent by a terminal in the service group; and if the reception status information of the first broadcast bearer does not satisfy a third preset condition, sending, by the first BMS, a third message to the service server, where the third message carries an identifier of the terminal, and the third message is used to request the service server to send media data to the terminal by using a unicast bearer.

According to a second aspect, an embodiment of the present application provides a broadcast bearer management device, where the device includes:

a receiving unit, configured to receive a first message sent by a service server, where the first message includes a group identifier of a service group;

a determining unit, configured to determine a first broadcast bearer for the service group based on the first message; and a sending unit, configured to send a second message to the service server, where the second message carries user plane information of the first broadcast bearer.

The first message sent by the service server is received, a usable broadcast bearer is determined for the service group based on the group identifier of the service group included in the first message, and the user plane information of the determined broadcast bearer is added to the second message and sent to the service server, so that the service server can use the broadcast bearer to transmit data for the group. A broadcast bearer management function is decoupled from an application service layer control function. In addition, compared with the prior art, broadcast bearers are centrally managed and used at one control point, so that the broadcast bearers are centrally scheduled.

In a design solution of the present application, a first BMS sends transmission mode indication information to the service server, where the transmission mode indication information may also be referred to as indication information. In this embodiment of the present application, a name of the indication information is not limited, and the indication information is used to instruct the service server to transmit data to the service group by using a transmission mode determined by the first BMS.

In a design solution, the transmission mode indication information is used to instruct the service server to use a broadcast transmission mode for the service group; or the transmission mode indication information is used to instruct the service server to use a broadcast transmission mode or use a unicast transmission mode for all members or some members in the service group; or the transmission mode indication information is used to instruct the service server to switch from a unicast transmission mode to a broadcast transmission mode or switch from a broadcast transmission mode to a unicast transmission mode or use only a unicast transmission mode or use only a broadcast transmission mode or stop using a unicast transmission mode or stop using a broadcast transmission mode for the service group.

In another design solution, the second message includes the transmission mode indication information.

With reference to the second aspect, in a first possible implementation of the second aspect, the device further includes an obtaining unit, where the obtaining unit is configured to obtain reception status information of at least one broadcast bearer sent by at least one terminal; and the determining unit is specifically configured to determine the first broadcast bearer for the service group based on the first message and the reception status information of the at least one broadcast bearer sent by the at least one terminal.

With reference to the first possible implementation of the second aspect, in a second possible implementation of the second aspect, the first message further includes service description information, and the determining unit is specifically configured to:

determine the first broadcast bearer for the service group if the at least one broadcast bearer satisfies the service description information and the reception status information of the at least one broadcast bearer sent by the at least one terminal satisfies a first preset condition.

With reference to the second aspect, in a third possible implementation of the second aspect, the device further includes an establishment unit, where the establishment unit is configured to establish the first broadcast bearer based on the first message;

the sending unit is further configured to send a broadcast bearer announcement message to at least one terminal, where the broadcast bearer announcement message carries bearer information of the first broadcast bearer;

the receiving unit is further configured to receive reception status information of the first broadcast bearer sent by the at least one terminal; and the determining unit is specifically configured to: if the reception status information of the first broadcast bearer sent by the at least one terminal satisfies a first preset condition, determine the first broadcast bearer for the service group.

With reference to the third possible implementation of the second aspect, in a fourth possible implementation of the second aspect, the device further includes an obtaining unit, where the obtaining unit is configured to obtain reception status information of at least one broadcast bearer sent by the at least one terminal; and if the reception status information of the at least one broadcast bearer sent by the at least one terminal does not satisfy the first preset condition, the establishment unit establishes the first broadcast bearer based on the first message.

With reference to the third possible implementation of the second aspect, in a fifth possible implementation of the second aspect, the first message includes service description information, and the establishment unit is specifically configured to:

if the service description information does not satisfy a second preset condition, establish the first broadcast bearer based on the first message.

With reference to the fifth possible implementation of the second aspect, in a sixth possible implementation of the second aspect, the obtaining unit is further configured to obtain location information of a terminal in the service group; and the establishment unit is specifically configured to establish the first broadcast bearer based on the service description information and the location information of the terminal in the service group.

With reference to the sixth possible implementation of the second aspect, in a seventh possible implementation of the second aspect, the obtaining unit is specifically configured to: obtain the location information of the terminal in the service group from at least one of the service server, a group management server, a terminal location management server, and a second BMS; or receive the location information sent by the terminal in the service group.

With reference to the seventh possible implementation of the second aspect, in an eighth possible implementation of the second aspect, the sending unit is further configured to send a broadcast bearer synchronization message to the second BMS, where the broadcast bearer synchronization message includes the bearer information and the user plane information of the first broadcast bearer.

In a design solution, the broadcast bearer synchronization message further includes the group identifier.

With reference to the second aspect, in a ninth possible implementation of the second aspect, the receiving unit is further configured to receive reception status information of the first broadcast bearer sent by a terminal in the service group; and if the reception status information of the first broadcast bearer does not satisfy a third preset condition, the sending unit is further configured to send a third message to the service server, where the third message carries an identifier of the terminal, and the third message is used to request the service server to send media data to the terminal by using a unicast bearer.

According to a third aspect, an embodiment of the present application provides a broadcast bearer management device. The device includes a processor and a memory. The memory is configured to store a program. The processor runs the program in the memory to:

receive a first message sent by a service server, where the first message includes a group identifier of a service group;

determine a first broadcast bearer for the service group based on the first message; and send a second message to the service server, where the second message carries user plane information of the first broadcast bearer.

According to a fourth aspect, an embodiment of the present application provides a computer storage medium, configured to store a computer software instruction, where a computer runs the instruction to:

receive a first message sent by a service server, where the first message includes a group identifier of a service group;

determine a first broadcast bearer for the service group based on the first message; and send a second message to the service server, where the second message carries user plane information of the first broadcast bearer.

Based on the broadcast bearer management method and device provided in the embodiments of the present application, the first message sent by the service server is received, a usable broadcast bearer is determined for the service group based on the group identifier of the service group included in the first message, and the user plane information of the determined broadcast bearer is added to the second message and sent to the service server, so that the service server can use the broadcast bearer to transmit data for the group. A broadcast bearer management function is decoupled from an application service layer control function. In addition, compared with the prior art, broadcast bearers are centrally managed and used at one control point, so that the broadcast bearers are centrally scheduled.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show only some embodiments of the present application, and a person of ordinary skill in the art may derive other drawings from these accompanying drawings without creative efforts.

DESCRIPTION OF EMBODIMENTS

Embodiments of the present application provide a broadcast bearer management method and a device thereof, applicable to an architecture of a mission critical service system such as an MCPTT system, an MCVID system, and an MCDATA system. The architecture of the system is shown in FIG. 5 and FIG. 6.

Figure 1:
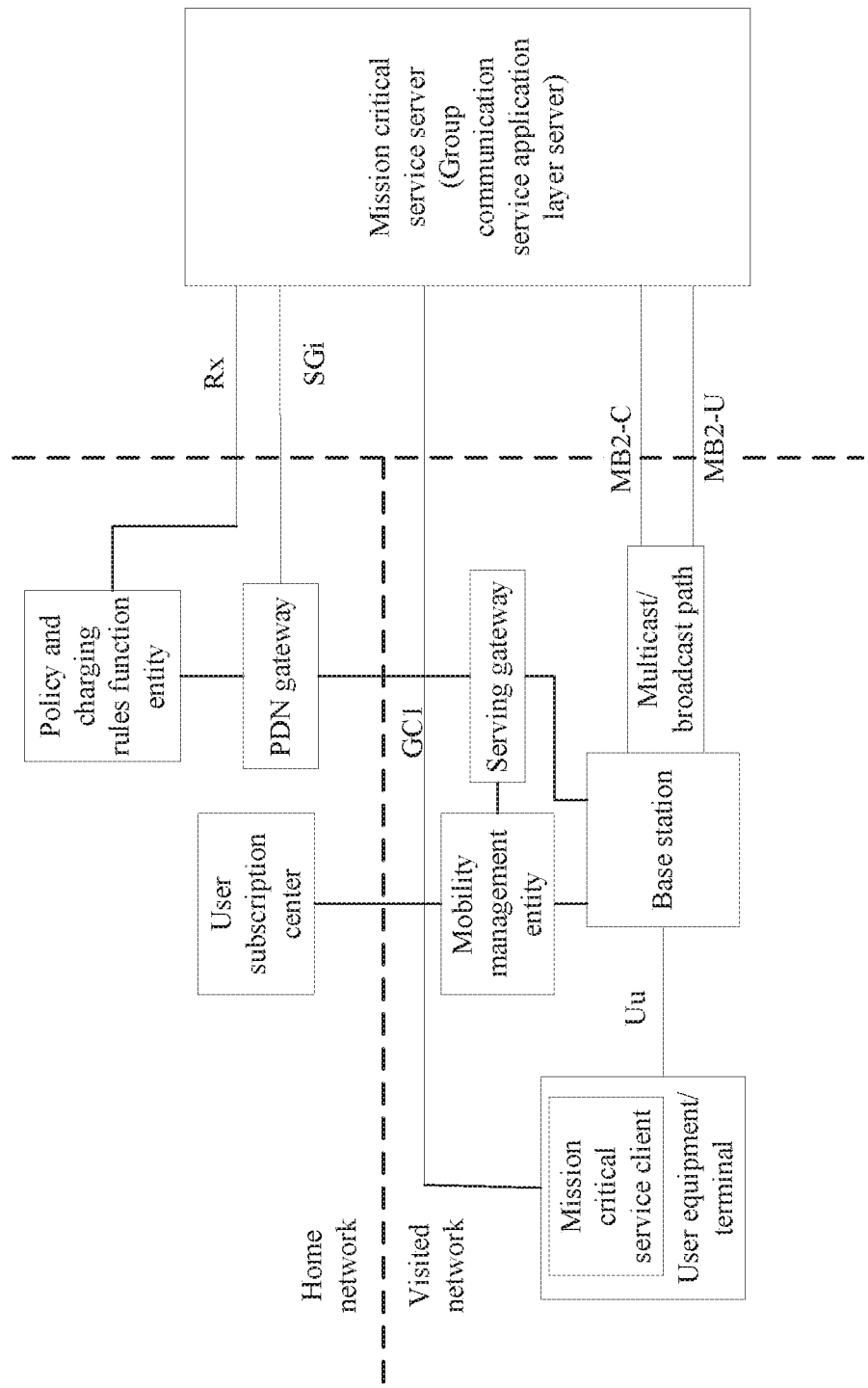
FIG. 1 shows a network architecture in which an MCPTT service is based on GCSE_LTE in the prior art.
Figure 2:
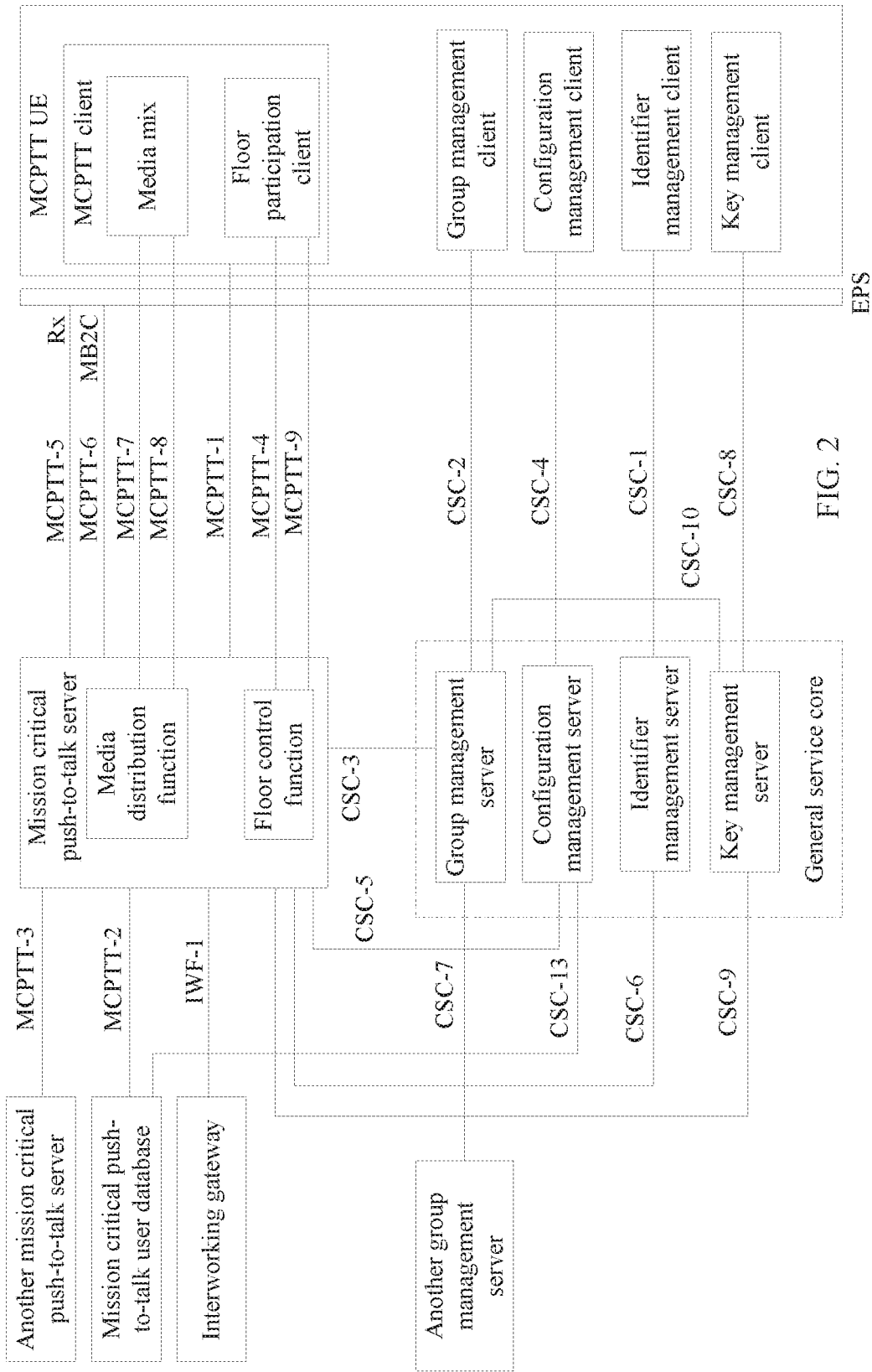
FIG. 2 is a schematic diagram of an architecture and a function model of an MCPTT network in the prior art.
Figure 3:
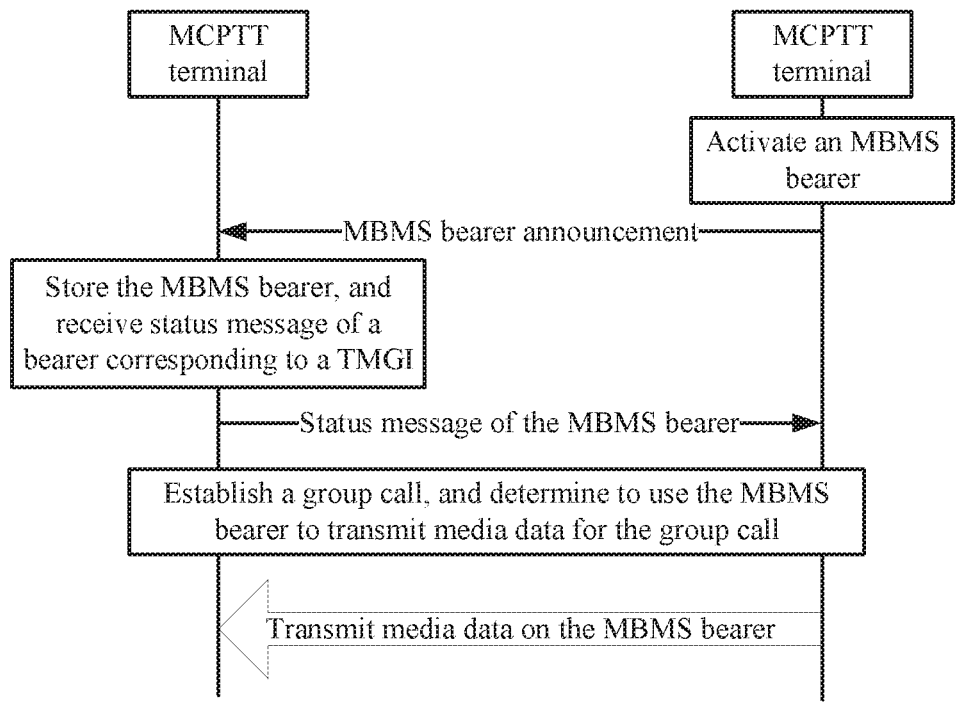
FIG. 3 is a flowchart of a method for pre-establishing a broadcast bearer based on an MCPTT architecture.
Figure 4:
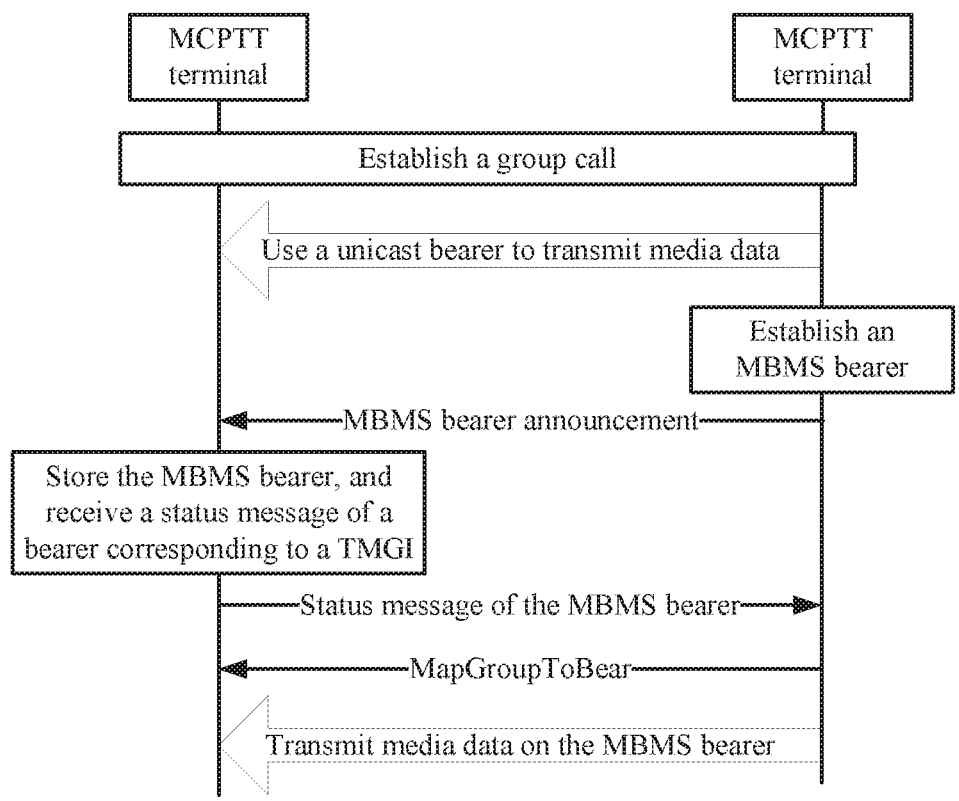
FIG. 4 is a flowchart of a method for dynamically establishing a broadcast bearer based on an MCPTT architecture.
Figure 5:
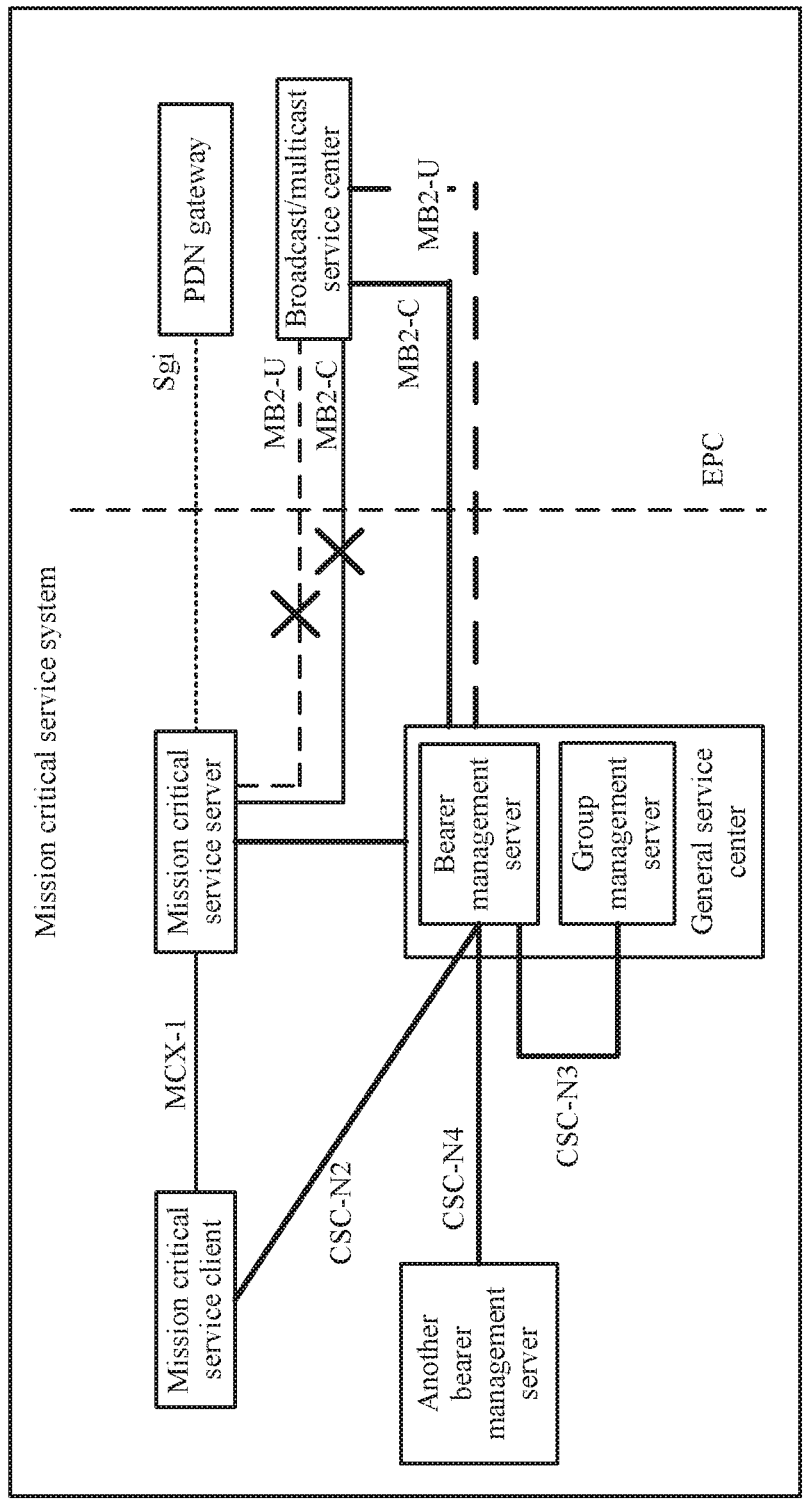
FIG. 5 shows a network architecture in which broadcast bearer management and application service control are separated according to an embodiment of the present application.

FIG. 5 shows a network architecture in which broadcast bearer management and application service control are separated. Compared with an existing MCPTT architecture, a bearer management server (BMS), an interface CSC-N1 between a mission critical service server (MC Service server) and the bearer management server, an interface CSC-N2 between mission critical service user equipment (MC Service UE) and the bearer management server, an interface CSC-N3 between a group management server and the bearer management server, and an interface CSC-N4 between the bearer management server and another bearer management server are added. A control plane MB2-C interface and a user plane MB2-U interface provided by a mission critical push-to-talk server (MCPTT server) in the existing MCPTT architecture are provided by the bearer management server BMS instead.

Figure 6:
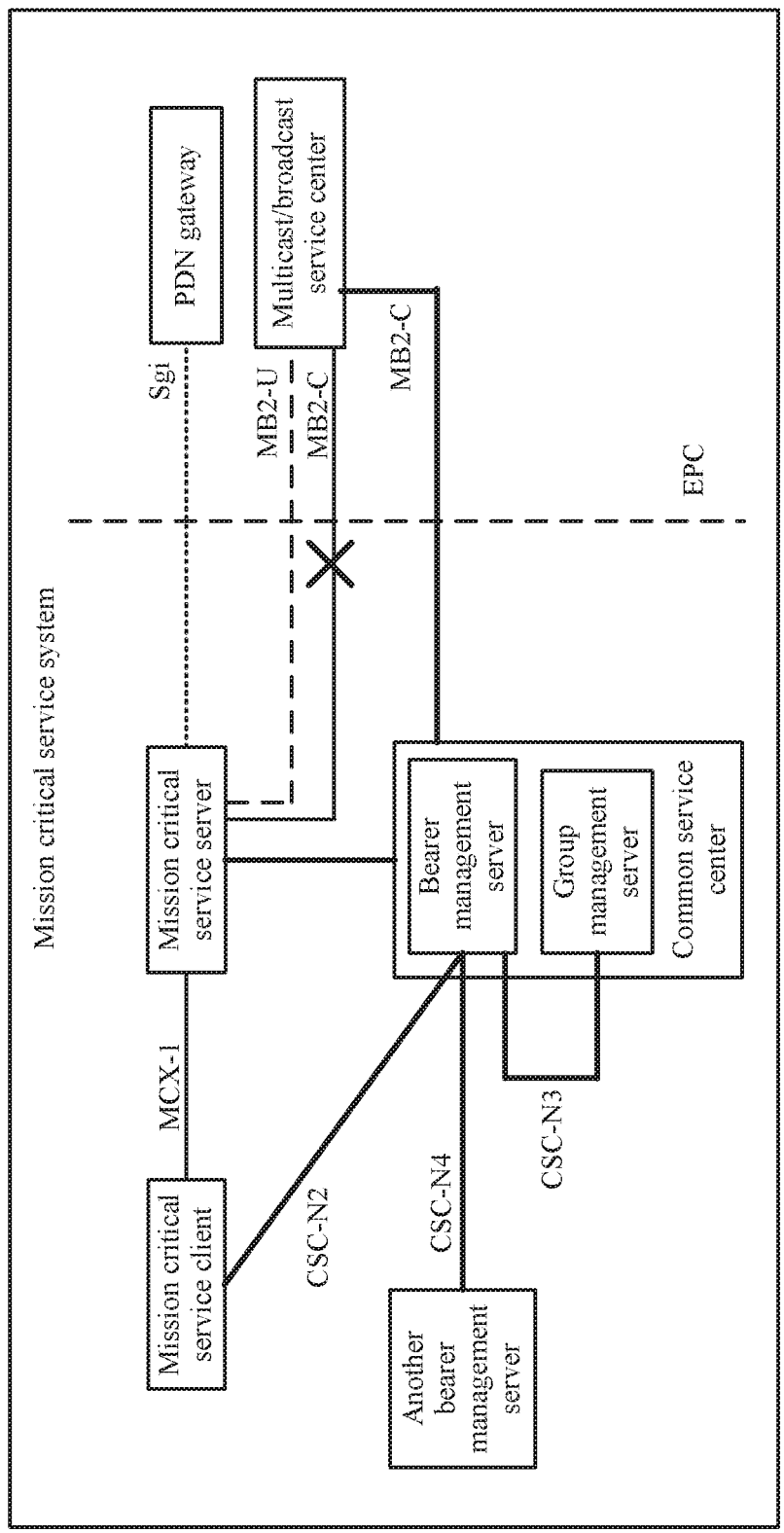
FIG. 6 shows another network architecture in which broadcast bearer management and application service control are separated according to an embodiment of the present application.

A main difference between FIG. 6 and FIG. 5 is whether a user plane (MB2-U) of a broadcast bearer is moved down. As shown in FIG. 6, only an MB2-C control plane of a broadcast bearer is moved down, and the user plane MB2-U keeps unchanged.

In the network architecture in which broadcast bearer management and application service control are separated provided in the embodiments of the present application, the mission critical service server MC service server is mainly responsible for call control and media control, and is a logical entity. During specific implementation, the MC service server may be an MCPTT server, an MCVideo server, an MCData server, or the like.

The mission critical service user equipment MC service UE may also be referred to as a mission critical service client (MC Service Client). The MC service UE is a peer application-layer entity of the MC service server and is mainly responsible for processing application-layer transactions.

The bearer management server BMS is mainly responsible for activating, switching, and centrally scheduling broadcast bearers, and may receive location information and reception status information of a broadcast bearer that are reported by the MC service UE.

Figure 7:
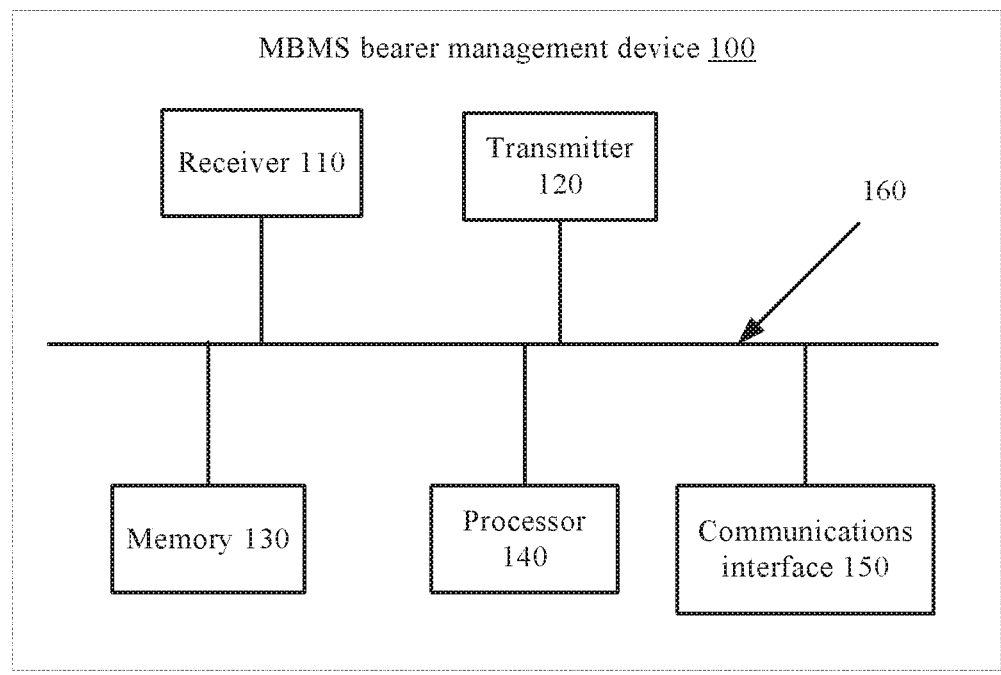
FIG. 7 shows a broadcast bearer management device according to an embodiment of the present application.

FIG. 7 shows a broadcast bearer management device according to an embodiment of the present application. The device may be a bearer management server BMS. As shown in FIG. 7, the broadcast bearer management device 100 includes a receiver 110, a transmitter 120, a memory 130, a processor 140, a communications interface 150, and a communications bus 160. The receiver 110, the transmitter 120, the memory 130, the processor 140, and the communications interface 150 are connected to the communications bus 160 to communicate with each other.

The receiver 110 is configured to receive, through the communications interface 150, data sent by a service server (for example, MC Service Server) and another device such as a terminal. The transmitter 120 is configured to send data to the service server (for example, MC service server) and the another device such as the terminal through the communications interface 150. The processor 140 may implement, by using the receiver 110 and the transmitter 120, data exchange with the service server and the terminal in the following embodiments shown in FIG. 8 to FIG. 16. The memory 130 is configured to store an instruction and data. The processor 140 is configured to invoke the instruction in the memory 130 to perform steps performed by a first bearer management server BMS in the following embodiments shown in FIG. 8 to FIG. 16.

In the embodiments of the present application, the processor 140 may be a central processing unit (CPU). The processor 140 may alternatively be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

The communications bus 160 may further include a power bus, a control bus, a status signal bus, and the like, in addition to a data bus. However, for clarity of description, various types of buses in the figure are denoted as the communications bus 160.

The memory 130 may include a read-only memory and a random access memory, and provide an instruction and data for the processor 140. A part of the memory may further include a non-volatile random access memory.

For ease of description, the technical solutions in the embodiments of the present application are described in detail with reference to FIG. 8 to FIG. 16. It should be noted that a terminal in the present application may be an MC service client in a mission critical service system. It should be understood that this is merely an example for describing the technical solutions in the embodiments of the present application, and does not constitute any limitation on the embodiments of the present application.

Figure 8:
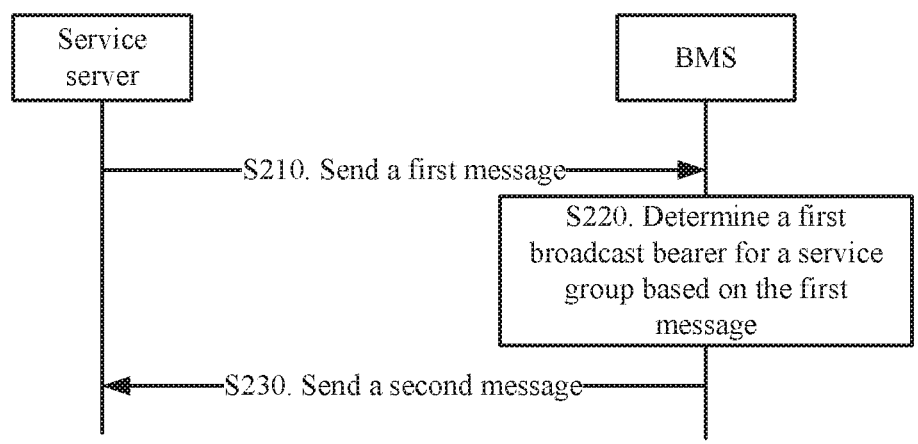
FIG. 8 is a flowchart of a broadcast bearer management method according to an embodiment of the present application.

FIG. 8 is a flowchart of a broadcast bearer management method according to an embodiment of the present application. The method may be performed by the broadcast bearer management device 100 shown in FIG. 7. As shown in FIG. 8, the method 200 may include the following steps.

S210. A first bearer management server BMS receives a first message sent by a service server, where the first message includes a group identifier of a service group.

A network system in which broadcast bearer management and application service control are separated may include one or more bearer management servers BMSs. The first BMS may be one or more BMSs.

The first message is used to trigger a BMS to determine a usable broadcast bearer for the service group (or referred to as a group). In this embodiment of the present application, the first message may be referred to as a broadcast bearer request message, which is used to request the BMS to determine a usable broadcast bearer for the service group or determine, for the service group, that a usable broadcast bearer exists, so that the service server uses the usable broadcast bearer provided by the BMS to transmit data for a terminal in the group. The transmitted data may be media plane data or may be a media plane signaling message.

It should be noted that in this embodiment of the present application, a message with another name may be used as the first message for the BMS to determine a usable broadcast bearer. This is not limited in this embodiment of the present application.

S220. The first BMS determines a first broadcast bearer for the service group based on the first message.

In the network system in which broadcast bearer management and application service control are separated, before the service group performs group communication, one or more broadcast bearers may be pre-established. Each broadcast bearer corresponds to a specific service area. Each broadcast bearer has a unique identifier, which may be a temporary mobile group identity (TMGI). Each broadcast bearer has service description information of a corresponding broadcast bearer. The service description information may include quality of service (QoS). Bearer information of a broadcast bearer includes a TMGI, a radio frequency, and a broadcast service area. User plane information includes an IP address and a port number of a user-plane BM-SC of the broadcast bearer.

Specifically, when one or more broadcast bearers stored in the BMS include a usable broadcast bearer that satisfies a service requirement of a service group, the broadcast bearer is determined as a usable broadcast bearer for the service group. The broadcast bearer stored in the BMS may be pre-established by the BMS or may be obtained from another BMS and stored.

It should be noted that when no usable broadcast bearer is found for the service group from the broadcast bearer stored in the BMS, the BMS may establish a broadcast bearer for the service group, to determine whether the established broadcast bearer is a usable broadcast bearer for the service group. When the established broadcast bearer is a usable broadcast bearer for the service group, the established broadcast bearer is determined as a broadcast bearer used for the service group.

During establishment of the broadcast bearer, another transmission mode may be used to transmit data for communication of the service group. For example, a unicast bearer is used to transmit data.

S230. The first BMS sends a second message to the service server, where the second message carries user plane information of the first broadcast bearer.

The second message is used to notify the service server of a broadcast bearer that can be used by the service group to transmit data. In this embodiment of the present application, the second message may be referred to as a broadcast bearer binding message.

The user plane information of the first broadcast bearer may be an IP address and a port number of a user-plane broadcast multicast-service center (BM-SC). If the service server transmits data by using the first broadcast bearer, the service server sends the data to the BM-SC corresponding to the IP address and the port number of the first broadcast bearer.

According to the broadcast bearer management method provided in this embodiment of the present application, the first message sent by the service server is received, a usable broadcast bearer is determined for the service group based on the group identifier of the service group included in the first message, and the user plane information of the determined broadcast bearer is added to the second message and sent to the service server, so that the service server uses the broadcast bearer to transmit group communication data of the service group. A broadcast bearer management function is decoupled from an application service layer control function. In addition, compared with the prior art, broadcast bearers are centrally managed and used at one control point, so that the broadcast bearers are centrally scheduled.

It should be noted that the first message may include group identifiers of a plurality of service groups. To be specific, one service server may request broadcast bearers for a plurality of service groups at the same time. According to the method 200 shown in FIG. 8, the BMS may determine, for each service group, whether a usable broadcast bearer can be provided.

Figure 9:
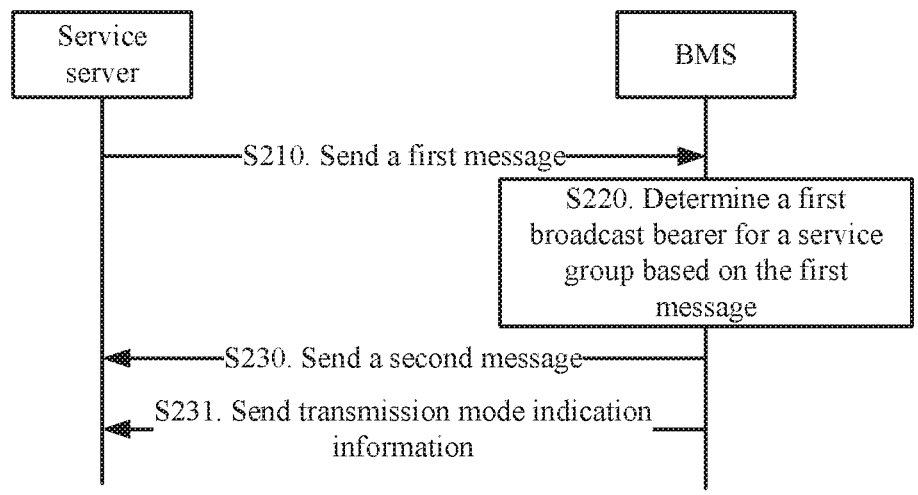
FIG. 9 is a flowchart of another broadcast bearer management method according to an embodiment of the present application.

Optionally, in an implementation scenario of the foregoing embodiment, as shown in FIG. 9, the foregoing method further includes the following step.

S231. The first BMS sends transmission mode indication information to the service server.

S231 may be implemented by using step S230 or may be implemented after or before S230. This is not limited in the present application.

The transmission mode indication information may be used to instruct the service server to use a broadcast transmission mode for the service group; or the transmission mode indication information may be used to instruct the service server to use a broadcast transmission mode or use a unicast transmission mode for all members or some members in the service group; or the transmission mode indication information may be used to instruct the service server to switch from a unicast transmission mode to a broadcast transmission mode or switch from a broadcast transmission mode to a unicast transmission mode or use only a unicast transmission mode or use only a broadcast transmission mode or stop using a unicast transmission mode or stop using a broadcast transmission mode for the service group.

Specifically, the transmission mode indication information may explicitly instruct the service server to use a transmission mode for the service group, for example, explicitly instruct the service server to use a unicast transmission mode, or explicitly instruct the service server to use a broadcast transmission mode. Alternatively, the transmission mode indication information may implicitly instruct the service server to use a transmission mode for the service group, for example, not to use or to stop using a unicast transmission mode, or not to use or to stop using a broadcast mode.

In an optional implementation, the transmission mode indication information may be an independent message. Specifically, a name or a type of the message can function as the transmission mode indication information. For example, the second message may be the transmission mode indication information. Further, after receiving the second message, the service server transmits data to the terminal in the service group by using a broadcast bearer determined by the BMS.

In another optional implementation, the transmission mode indication information may be an information element in a message, for example, a unicast transmission mode enabling/disabling information element or a broadcast transmission mode enabling/disabling information element. Assuming that the transmission mode indication information is a broadcast transmission mode enabling information element, the broadcast transmission mode enabling information element may be placed in the second message and passed to the service server, or may be placed in another message and sent to the service server. Further, after receiving the transmission mode indication information, the service server transmits data to the terminal in the service group by using a broadcast bearer determined by the BMS.

For another example, the information element may be the user plane information of the first broadcast bearer. After receiving the user plane information of the first broadcast bearer, the service server transmits data to the terminal in the service group by using the first broadcast bearer determined by the BMS.

In addition, when the transmission mode indication information is used to instruct the service server to use a broadcast transmission mode or use a unicast transmission mode for some members in the service group, the transmission mode indication information may further include a list of some terminals in the service group. If a broadcast transmission mode or a unicast transmission mode is used for some terminals in the service group, the transmission mode indication information further includes a list that includes one or more terminals in the service group and instructs the service server to use a broadcast transmission mode or a unicast transmission mode for the terminal in the list. For example, the transmission mode indication information may include the user plane information of the first broadcast bearer and a terminal list. In this case, after receiving the user plane information of the first broadcast bearer and the terminal list, the service server uses a unicast bearer to perform transmission for a terminal in the terminal list, and uses a broadcast bearer to perform transmission for another terminal in the terminal list.

It should be noted that the broadcast transmission mode may be referred to as a broadcast bearer mode, and the unicast transmission mode may be referred to as a unicast bearer mode.

In a possible implementation, when the transmission mode indication information is used to instruct the service server to use a broadcast transmission mode or use a unicast transmission mode for all members in the service group, the transmission mode indication information may further include a list of all terminals in the service group, for example, an identifier list. Obviously, the transmission mode indication information may alternatively not carry a terminal identifier to implicitly indicate all the terminals in the service group.

Figure 10:
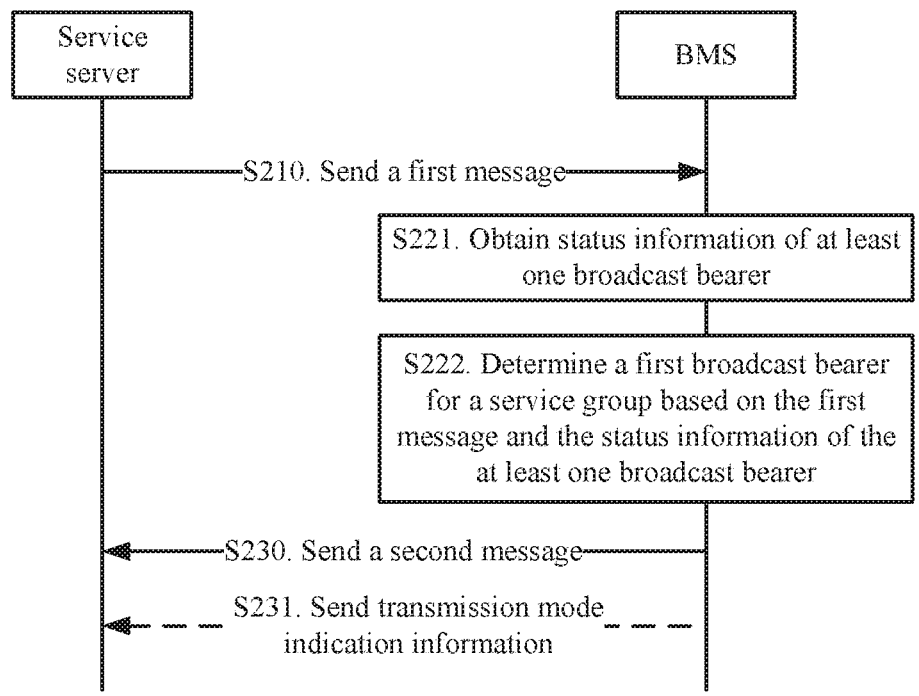
FIG. 10 is a flowchart of still another broadcast bearer management method according to an embodiment of the present application.

Optionally, as shown in FIG. 10, in another embodiment of the present application, that the first BMS determines a first broadcast bearer for the service group based on the first message includes the following steps.

S221. The first BMS obtains reception status information of at least one broadcast bearer sent by at least one terminal.

After obtaining a broadcast bearer from the another BMS and storing the broadcast bearer, the BMS broadcasts bearer information of the broadcast bearer to the at least one terminal. These terminals may belong to a BMS system or all BMS systems, or may be located in a specific physical location area, or may be located in a specific broadcast service area, so that a terminal that receives the bearer information of the broadcast bearer monitors channel quality of the broadcast bearer, determines whether the terminal can receive data on the broadcast bearer, and sends the reception status information of the broadcast bearer to the BMS.

The BMS receives reception status information of one or more pre-established broadcast bearers sent by the at least one terminal.

It should be noted that in this embodiment of the present application, the BMS may obtain the reception status information of the at least one broadcast bearer sent by the at least one terminal before receiving the first message sent by the service server, that is, before S210.

It should be noted that the reception status information of the broadcast bearer received by the BMS is a status indication indicating that, for example: data can be received, or data cannot be received; the broadcast bearer is being monitored, or the broadcast bearer is not being monitored; and "good" or "poor". "Data can be received", "the broadcast bearer is being monitored", and "good" represent that the channel quality of the broadcast bearer satisfies a preset threshold, and a user can receive data on the broadcast bearer. "Poor" represents that the channel quality of the broadcast bearer does not satisfy the preset threshold, and the user cannot receive data on the broadcast bearer.

That the terminal determines whether the terminal can receive data on the broadcast bearer does not rely on that the service server has transmitted data on the broadcast bearer. The terminal may determine, by using periodic scheduling information on the broadcast bearer, whether the terminal can receive data on the broadcast bearer. The scheduling information is not sent by the service server. The terminal may alternatively use another determining method. This is not limited in the present application.

S222. The first BMS determines the first broadcast bearer for the service group based on the first message and the reception status information of the at least one broadcast bearer sent by the at least one terminal.

In this embodiment of the present application, the first message may further include service description information, and the service description information may be quality of service QoS information. That the first BMS determines the first broadcast bearer for the service group based on the first message and the reception status information of the at least one broadcast bearer sent by the at least one terminal may include:

After receiving the reception status information of the at least one broadcast bearer sent by the at least one terminal, the first BMS collects statistics. For each broadcast bearer, terminals in each group that send reception status information indicating that data on the broadcast bearer can be received (for example, "data can be received", "the broadcast bearer is being monitored", or "good") are counted. A quantity obtained through counting may be a percentage of the terminals in all the terminals in the group. Statistical information in an implementation is shown in the following table.

For example, currently, the BMS receives reception statuses of three broadcast bearers reported by a plurality of terminals.

| Broadcast bearer 1 | Group 1: Five terminals send "data can be received", or 50% of the terminals can receive data. Group 2: Eight terminals send "data can be received", or 80% of the terminals can receive data. |
| --- | --- |
| Broadcast bearer 2 | Group 1: Three terminals send "data can be received", or 30% of the terminals can receive data. Group 2: One terminal sends "data can be received", or 10% of the terminals can receive data. |
| Broadcast bearer 3 | Group 1: Zero terminals send "data can be received", or 0% of the terminals can receive data. Group 2: Ten terminals send "data can be received", or 100% of the terminals can receive data. |

In another implementation, for the at least one broadcast bearer, terminals in each group that cannot receive data on the broadcast bearer may be counted. Alternatively, both the terminals that can receive data and the terminals that cannot receive data are counted. This is not limited in the present application.

The first broadcast bearer is determined for the service group if at least one broadcast bearer satisfies the service description information, that is, when service description information of one or more pre-established broadcast bearers is consistent with service description information that is in the first message and that is of a broadcast bearer required by the service group requests, and the received reception status information of the at least one broadcast bearer sent by the at least one terminal satisfies a first preset condition. The first preset condition is a policy condition configured by a service operator. For example, when a quantity of terminals in a group that can receive data on a broadcast bearer reaches N or reaches M %, it is determined that the broadcast bearer is the first broadcast bearer. These policy conditions may further include another condition used to determine the first broadcast bearer. This is not limited in the present application.

Figure 11:
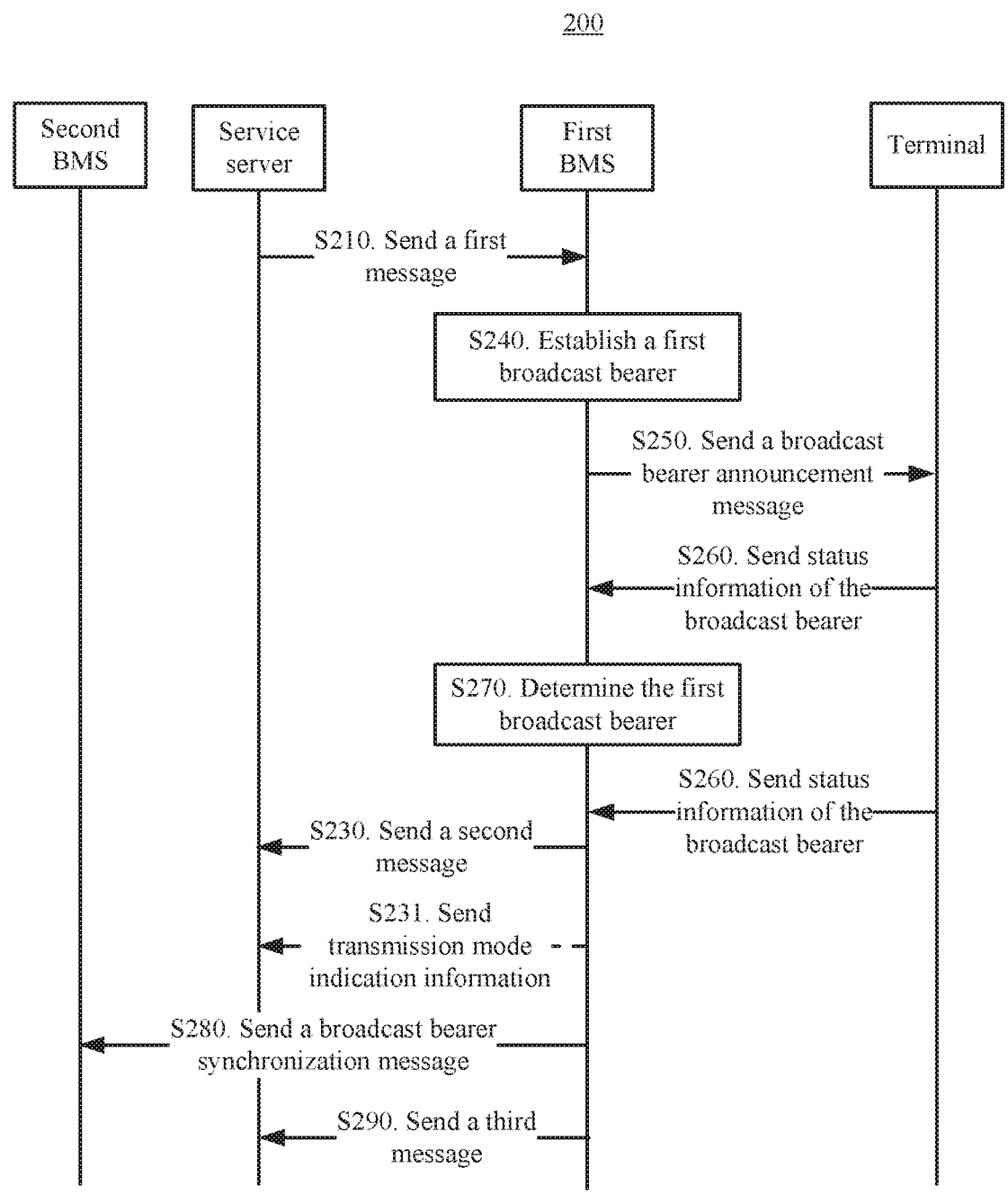
FIG. 11 is a flowchart of another MBMS bearer management method according to an embodiment of the present application.

Optionally, as shown in FIG. 11, in another embodiment of the present application, that the first BMS determines a first broadcast bearer for the service group based on the first message includes the following steps.

S240. The first BMS establishes a first broadcast bearer based on the first message.

When receiving the first message sent by the service server, the BMS determines whether there is a usable broadcast bearer for the service group corresponding to the group identifier of the service group carried in the first message. When the BMS stores a pre-established broadcast bearer, the BMS determines, from the stored broadcast bearer, whether there is a usable broadcast bearer for the service group. The broadcast bearer stored in the BMS may be obtained from the another BMS.

When determining, based on the group identifier of the service group, that none of the stored broadcast bearers can be used for the service group, the BMS establishes a broadcast bearer (the first broadcast bearer) for the service group and stores information about the established broadcast bearer. The information about the established broadcast bearer includes bearer information of the broadcast bearer, service description information of the broadcast bearer, and user plane information of the broadcast bearer. The bearer information of the broadcast bearer includes a temporary mobile group identity (TMGI) used to uniquely identify the broadcast bearer, and may further include a radio frequency and an MBMS service area identifier. The service description information of the established broadcast bearer includes information such as QoS. The user plane information of the established broadcast bearer includes an IP address and a port number of a user-plane BM-SC.

Optionally, in an embodiment of the present application, before the first BMS establishes the first broadcast bearer based on the first message, the method further includes:

obtaining, by the first BMS, reception status information of at least one broadcast bearer sent by the at least one terminal; and if the reception status information of the at least one broadcast bearer sent by the at least one terminal does not satisfy the first preset condition, establishing, by the first BMS, the first broadcast bearer based on the first message.

The at least one broadcast bearer may be one or more broadcast bearers stored in the BMS. Obtaining reception status information of at least one broadcast bearer sent by the at least one terminal may be: broadcasting, by the BMS, bearer information and user plane information of the stored one or more broadcast bearers to the at least one terminal. The one or more terminals may be terminals in the service group corresponding to the group identifier carried in the first message, or all terminals in a system corresponding to a BMS, or all terminals in systems corresponding to all BMSs. or terminals located in a specific physical location area, or terminals located in a specific broadcast service area. A terminal that receives a broadcast message monitors the reception status information of the at least one broadcast bearer, determines whether the terminal can receive data on the broadcast bearer, and sends the received reception status information of the at least one broadcast bearer to the BMS.

Description of the reception status information of the broadcast bearer is the same as that of the reception status information of the broadcast bearer in S221.

The description after the BMS receives the reception status information of the at least one broadcast bearer sent by the at least one terminal is the same as the corresponding description in S222.

It should be noted that, for whether the reception status information of the at least one broadcast bearer that is sent by the at least one terminal and that is received by the BMS satisfies or does not satisfy the first preset condition in this embodiment of the present application, the first preset condition is not limited. The first preset condition may be a quantity of terminals in a service group that send reception status information, indicating "good", of a broadcast bearer on which the terminals receive data, or may be another condition.

Optionally, in another embodiment of the present application, the first message includes service description information, and that the first BMS establishes a first broadcast bearer based on the first message may include:

if the service description information does not satisfy a second preset condition, establishing, by the first BMS, the first broadcast bearer based on the first message.

When the service description information of the broadcast bearer stored in the BMS is inconsistent with the service description information that is carried in the first message and that is of the broadcast bearer required by the service group, the BMS establishes a broadcast bearer for the service group, and stores bearer information and user plane information of the established broadcast bearer.

Optionally, in another embodiment of the present application, that the first BMS establishes a first broadcast bearer based on the first message may include:

obtaining, by the first BMS, location information of a terminal in the service group; and establishing, by the first BMS, the first broadcast bearer based on the service description information and the location information of the terminal in the service group.

Specifically, the obtaining, by the first BMS, location information of the terminal in the service group includes:

obtaining, by the first BMS, the location information of the terminal in the service group from at least one of the service server, a group management server, a terminal location management server, and a second BMS, where the BMS may obtain the location information of the terminal in the group at any moment before receiving the first message sent by the service server or establishing a new broadcast bearer.

In this embodiment of the present application, the BMS may further receive the location information sent by the terminal in the service group, to obtain the location information of the terminal in the service group.

It should be noted that, after receiving the first message sent by the service server, the BMS may obtain the group identifier of the service group from the first message and determine the service group for which a usable broadcast bearer is to be found.

In addition, the BMS may obtain information about a group and a member (for example, a terminal) in the group from the group management server GMS before establishing a new broadcast bearer.

After receiving the first message sent by the service server, the BMS may obtain, based on the information about the group and the member in the group, location information that is carried in the corresponding first message and that corresponds to a group member, namely, a terminal, in the service group.

After obtaining the location information of the terminal in the service group, the BMS may establish a new broadcast bearer based on the service description information and the location information of the terminal.

S250. The first BMS sends a broadcast bearer announcement message to the terminal, where the broadcast bearer announcement message carries bearer information of the first broadcast bearer.

The BMS sends the bearer information of the established broadcast bearer to all terminals in the service group, so that a terminal that receives the bearer information of the broadcast bearer monitors the established broadcast bearer, determines whether the terminal can receive data on the broadcast bearer, and sends reception status information of the broadcast bearer to the BMS. Description of a reception status of the broadcast bearer is the same as the related description in step S221.

It should be noted that in this embodiment of the present application, the bearer information of the established broadcast bearer is added to the broadcast bearer announcement message and broadcast to all the terminals in the service group. In this embodiment of the present application, the bearer information of the established broadcast bearer may be alternatively added to other messages and broadcast to the terminals in the service group. In other words, in this embodiment of the present application, the name of a message for broadcasting the bearer information of the established broadcast bearer is not limited.

S260. The first BMS receives reception status information of the first broadcast bearer sent by the at least one terminal. The information may be sent at any moment after S250. The information may be sent a plurality of times. Each time a status in which the terminal receives data on a broadcast bearer changes, that is, changes from "data can be received" to "data cannot be received" or changes from "data cannot be received" to "data can be received", the reception status information is sent to the BMS.

S270. If the reception status information of the first broadcast bearer satisfies a first preset condition, determine the first broadcast bearer for the service group.

Description of the reception status information of the broadcast bearer is the same as the related description in S221. Description of statistics, collected by the BMS, of the reception status information of the at least one broadcast bearer sent by the at least one terminal is the same as the related description in S222. Description of the first preset condition is the same as the related description in S222.

When the quantity of terminals does not satisfy the preset threshold, another bearer, for example, a unicast bearer, is used to transmit data for the service group.

In this case, both the pre-established broadcast bearer and the broadcast bearer that is established in S240 exist in the system. In this case, the service server uses a unicast bearer to transmit data to the terminal in the service group. At the same time, a terminal that receives bearer information of at least one broadcast bearer is still monitoring the corresponding broadcast bearer. When a status in which the terminal receives data on the broadcast bearer changes, that is, when the terminal originally cannot receive data on the broadcast bearer but currently can receive data on the broadcast bearer, the terminal sends reception status information of the broadcast bearer to the BMS. The BMS determines the first broadcast bearer for the service group based on the group identifier of the service group in the first message and the received reception status information of the at least one broadcast bearer sent by the at least one terminal, and sends the second message to the service server. Description of the second message is the same as the related description in S230. After receiving the second message, the service server may use the first broadcast bearer determined by the BMS to transmit data. If the service server starts to transmit data by using the first broadcast bearer after receiving the second message, all terminals or some terminals in the group may receive both data transmitted by using a unicast bearer and data transmitted by using a broadcast bearer. According to a preconfigured policy, the service server may, for example, for a same terminal, stop using a unicast bearer to transmit data after using both a broadcast bearer and a unicast bearer to transmit data for a specific time, but use only a broadcast bearer to transmit data. Alternatively, another policy may be used. This is not limited in the present application. Alternatively, after receiving the transmission mode indication information in S231, the service server may determine, according to the transmission mode indication information, whether to use a broadcast transmission mode or a unicast transmission mode for the terminal in the group.

Optionally, as shown in FIG. 11, in another embodiment of the present application, after the first BMS sends the second message to the service server, the method 200 may further include the following step.

S280. The first BMS sends a broadcast bearer synchronization message to a second BMS, where the broadcast bearer synchronization message includes the bearer information and the user plane information of the first broadcast bearer.

The BMS synchronizes the bearer information and the user plane information of the established broadcast bearer to a BMS other than the first BMS.

Optionally, the message further includes the group identifier.

The BMS synchronizes, to a BMS other than the first BMS, the bearer information and the user plane information of the established broadcast bearer and information about the service group that uses the established broadcast bearer.

Optionally, as shown in FIG. 11, in another embodiment of the present application, if the first BMS receives the reception status information of the first broadcast bearer sent by the terminal in the service group, the method 200 may further include the following step.

S290. If the reception status information of the first broadcast bearer does not satisfy a third preset condition, the first BMS sends a third message to the service server, where the third message carries an identifier of the terminal, and the third message is used to request the service server to send media data to the terminal by using a unicast bearer.

In a process in which the service server uses a broadcast bearer to transmit data for the service group, when reception status information of a broadcast bearer that is sent by one or more terminals in the service group and that is received by the BMS is "poor", the BMS sends the third message to the service server. The third message may be a broadcast bearer switching request message. It should be noted that in this embodiment of the present application, the third message may have another name, and a name of the third message is not limited. The broadcast bearer switching request message includes an identifier of a terminal that sends reception status information, indicating "poor", of the broadcast bearer. The broadcast bearer switching request message is used to request the service server to use a unicast bearer to send media data to the terminal corresponding to the identifier of the terminal.

The third message may include the transmission mode indication information. In a data transmission process of group communication, the third message may be sent a plurality of times based on a reception status of the first broadcast bearer of a user.

It should be noted that S290 shown in FIG. 11 in this embodiment of the present application may also be completed in the solution shown in FIG. 9. For brevity of description, details are not described herein again.

It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

The technical solutions in the present application are described below in detail with reference to FIG. 12A and FIG. 12B to FIG. 15. Several concepts need to be described first before the embodiments shown in FIG. 11 to FIG. 15 are described.

A controlling mission critical service server (Controlling MC Service server) is a logical entity defined from a perspective of a group call. A mission critical service server of a group is defined to bear a main control function in the group call. The mission critical service server obtains location information of a group member, and receives reception status information of a broadcast bearer from a user equipment (UE) side, or may receive quality report information of a broadcast bearer.

A participating mission critical service server (Participating MC service server) is an MC service server with which a user registers, and is responsible for routing a request/response sent by a group member in a group call and routing a request message of a server to a group member.

A group call may be understood as a call of a group corresponding to a group identifier of a service group carried in a first message sent by a service server to a BMS.

It should be noted that a first BMS in FIG. 12A and FIG. 12B to FIG. 15 is a controlling MC service server, and may be referred to as a BMS for short below. If not specified as another BMS, a BMS throughout the specification is a controlling MC service server.

Figure 12A:
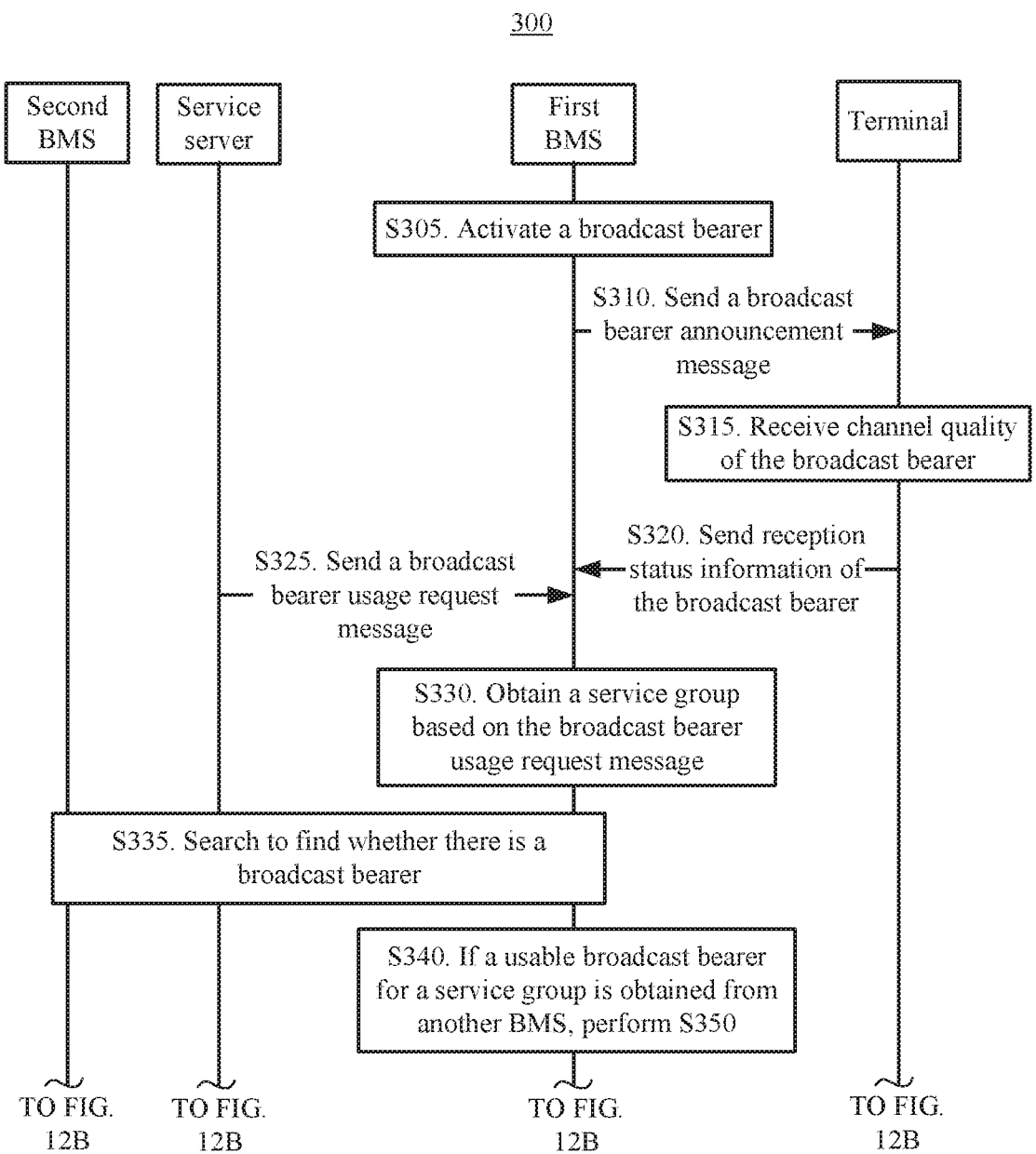
FIG. 12A and FIG. 12B are a flowchart of yet another broadcast bearer management method according to an embodiment of the present application.
Figure 12B:
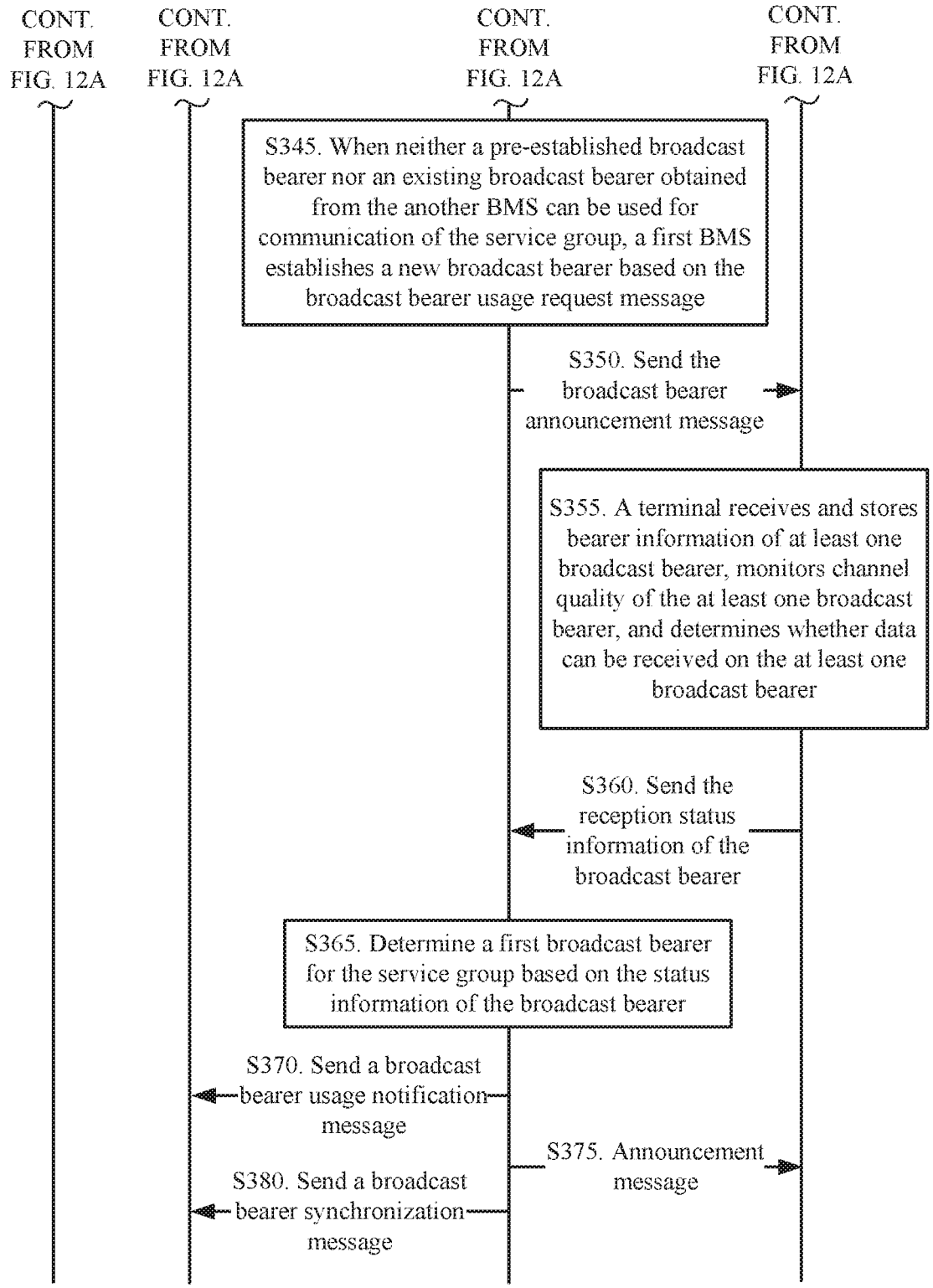

FIG. 12A and FIG. 12B are a flowchart of a broadcast bearer management method according to an embodiment of the present application.

This embodiment describes that when a service group exists on a controlling MC service server, a BMS is notified, and the BMS determines a broadcast bearer to be used. Each service group is related to one controlling MC service server and at least one participating MC service server. For media content of a same service group, all group members in a same MBMS service area monitor a broadcast bearer corresponding to a same TMGI. To be specific, only one broadcast bearer needs to be used for the same service group in the MBMS service area.

As shown in FIG. 12A and FIG. 12B, the method 300 may include the following steps.

S305. Activate a broadcast bearer.

A first BMS needs to first obtain related information such as group information and group member information from a group management server GMS. If the BMS has a usable broadcast bearer before a group session is established, the existing broadcast bearer is activated for use during the group session.

S310. A first BMS sends a broadcast bearer announcement message to a group member in a group.

The first BMS adds stored bearer information of at least one broadcast bearer to a broadcast bearer announcement (MBMS bearer announcement) message and sends the broadcast bearer announcement message to one or more group members (MC service client), which are also referred to as terminals.

S315. A terminal monitors channel quality of at least one broadcast bearer.

After receiving at least one broadcast bearer announcement message broadcast by the first BMS, the terminal stores the bearer information and user plane information of the at least one broadcast bearer. The bearer information of the broadcast bearer includes information related to the broadcast bearer, such as a TMGI that uniquely identifies the broadcast bearer, service area information, and service description information. The terminal monitors, based on the TMGI, a reception status of the broadcast bearer received on the corresponding broadcast bearer. When entering a broadcast bearer service area or detecting, in the service area, that a broadcast bearer corresponding to at least one TMGI has desirable channel quality and data can be received on the broadcast bearer, the terminal sends reception status information of the at least one broadcast bearer to the first BMS, so that the first BMS determines whether a broadcast transmission mode can be used for a service group.

For detailed description, refer to S221 in FIG. 10.

S320. The first BMS receives reception status information of the at least one broadcast bearer sent by the terminal.

The first BMS receives the reception status information of the at least one broadcast bearer sent by at least one terminal.

S325. A service server sends a broadcast bearer usage request message to the first BMS.

When a service group on a mission critical service server (MC Service server) initiates group communication, the MC service server sends the broadcast bearer usage request (MBMS bearer usage request) message to the first BMS. The broadcast bearer usage request message includes information such as a group identifier (group ID) and service description information. The group identifier (group ID) identifies the service group.

Optionally, after receiving the broadcast bearer usage request message, the first BMS returns, to the MC service server, a broadcast bearer usage response (MBMS bearer usage response) message, which is used to confirm reception of the broadcast bearer usage request message.

In this embodiment of the present application, the first BMS may receive broadcast bearer usage request messages corresponding to different service groups sent by one or more controlling MC service servers, or a plurality of broadcast bearer usage requests corresponding to different service groups sent by one controlling MC service server.

In another optional implementation, one MBMS bearer usage request message may carry broadcast bearer usage request information of a plurality of service groups, that is, a corresponding list of group identifiers (group ID) and service description information.

Optionally: S330. The first BMS obtains a service group based on the broadcast bearer usage request message.

The first BMS determines the service group based on the group identifier carried in the broadcast bearer usage request message, and obtains, based on a stored relationship between a service group and a group member, information such as a group member in the service group, location information of a group member of the service group, a group affiliation status corresponding to the group member, and whether the group member has joined the service group.

It should be noted that the first BMS may obtain the location information of the group member and the group affiliation status corresponding to the group member at any time after S325 and before step S330. However, the first BMS can obtain, only after S325, whether the group member has joined the group.

Optionally: S335. The first BMS searches a BMS in another system to find whether a usable broadcast bearer satisfying a requirement exists.

S340. If the first BMS finds, from another BMS, that the service group has a usable broadcast bearer, perform S350.

It should be noted that S335 may be alternatively performed before S325 in this embodiment of the present application. If S335 is performed before S325 and the BMS obtains a broadcast bearer that already exists on the another BMS, S350, S355, and S365 are performed.

S345. When the first BMS finds that neither a pre-established broadcast bearer nor an existing broadcast bearer obtained from the another BMS can be used for communication of the service group, the first BMS establishes a new broadcast bearer based on the broadcast bearer usage request message.

If the first BMS finds that currently there is no usable broadcast bearer, the first BMS dynamically establishes a new broadcast bearer according to a requirement. A process of dynamically establishing a new broadcast bearer is similar to the execution condition and process in S240 in FIG. 11. For brevity of description, details are not described herein again. S350, S355, and S360 are then performed.

S350. The first BMS sends the broadcast bearer announcement message to the terminal.

The first BMS sends, to the terminal, the broadcast bearer announcement (MBMS bearer announcement) message, which is used to notify the terminal of bearer information of the established broadcast bearer.

The terminal may be a terminal in the service group, or may be all terminals in the service group in the first BMS, or all terminals in systems corresponding to all BMSs, or all terminals in a specific physical area, or all terminals in a specific broadcast bearer service area.

S355. The terminal receives and stores bearer information of the at least one broadcast bearer, monitors the channel quality of the at least one broadcast bearer, and determines whether data can be received on the at least one broadcast bearer.

After receiving the broadcast bearer announcement message, the terminal (MC service client) stores the bearer information of the established broadcast bearer. The bearer information of the broadcast bearer includes one or more TMGIs, and may further include a broadcast service area and a radio frequency. The terminal starts to monitor reception status information of the broadcast bearer corresponding to the one or more TMGIs. When entering the MBMS service area or detecting, in the service area, that a broadcast bearer corresponding to at least one TMGI has desirable signal quality and data can be received on the broadcast bearer, the terminal reports the information to the first BMS, so that the information is used by the first BMS as reference information to determine whether a broadcast transmission mode can be used for a service group.

S360. The first BMS receives the reception status information of the broadcast bearer sent by the terminal.

The first BMS may further receive reception status information of the broadcast bearer sent by another terminal.

S365. The first BMS determines a broadcast bearer for the service group based on the reception status information of the broadcast bearer.

The first BMS determines, based on the obtained reception status information of the broadcast bearer, to use a broadcast bearer for the service group indicated in the broadcast bearer usage request message. A specific process thereof is the same as S220 shown in FIG. 8, S222 shown in FIG. 10, or S270 shown in FIG. 11. For brevity of description, details are not described herein again.

S370. The first BMS sends a broadcast bearer usage notification message to the service server.

The first BMS sends the broadcast bearer usage notification (MBMS bearer usage notify) message to the MC service server to instruct the service group indicated by the broadcast bearer usage request message sent by the MC service server to use a broadcast bearer to transmit media data. The broadcast bearer usage notification message includes bearer information of the used broadcast bearer.

Optionally, the broadcast bearer usage notification message further includes the group identifier of the service group.

S375. The first BMS sends, to the terminal in the service group, an announcement message of the broadcast bearer used by the group.

The first BMS sends the announcement message (MapGroupToBear) to a group member in the service group indicated by the broadcast bearer usage request message, to indicate that a broadcast bearer is to be used to transmit media data for the service group.

S380. Optionally, the first BMS sends a broadcast bearer synchronization message to a second BMS.

If the first BMS has established a broadcast bearer or has a broadcast bearer that is not synchronized to another BMS, the first BMS sends a broadcast bearer synchronization (MBMS bearer synchronize) message to a BMS in another system to notify bearer information and user plane information of the new broadcast bearer to the another BMS. Optionally, the broadcast bearer synchronization message further includes a group identifier of a service group for which the broadcast bearer is used. This embodiment describes a process in which bearer information from different BMSs is synchronized and collected. If there is no unsynchronized or new broadcast bearer, this step may be skipped.

According to the broadcast bearer management method provided in this embodiment of the present application, when receiving the broadcast bearer usage request message of one or more controlling MC service servers, the first BMS determines, based on the group identifier of the service group included in the received broadcast bearer usage request message, the service group, the location information of the group member, the received status information of the broadcast bearer sent by the group member in the service group, and the like, to determine to use the broadcast bearer to transmit media data of the service group, and then instruct the terminal in the service group and the service server (MC service server) to use the broadcast bearer to transmit media data, so that the group member and a controlling MC service server use a broadcast bearer to transmit media data of the service group.

Figure 13:
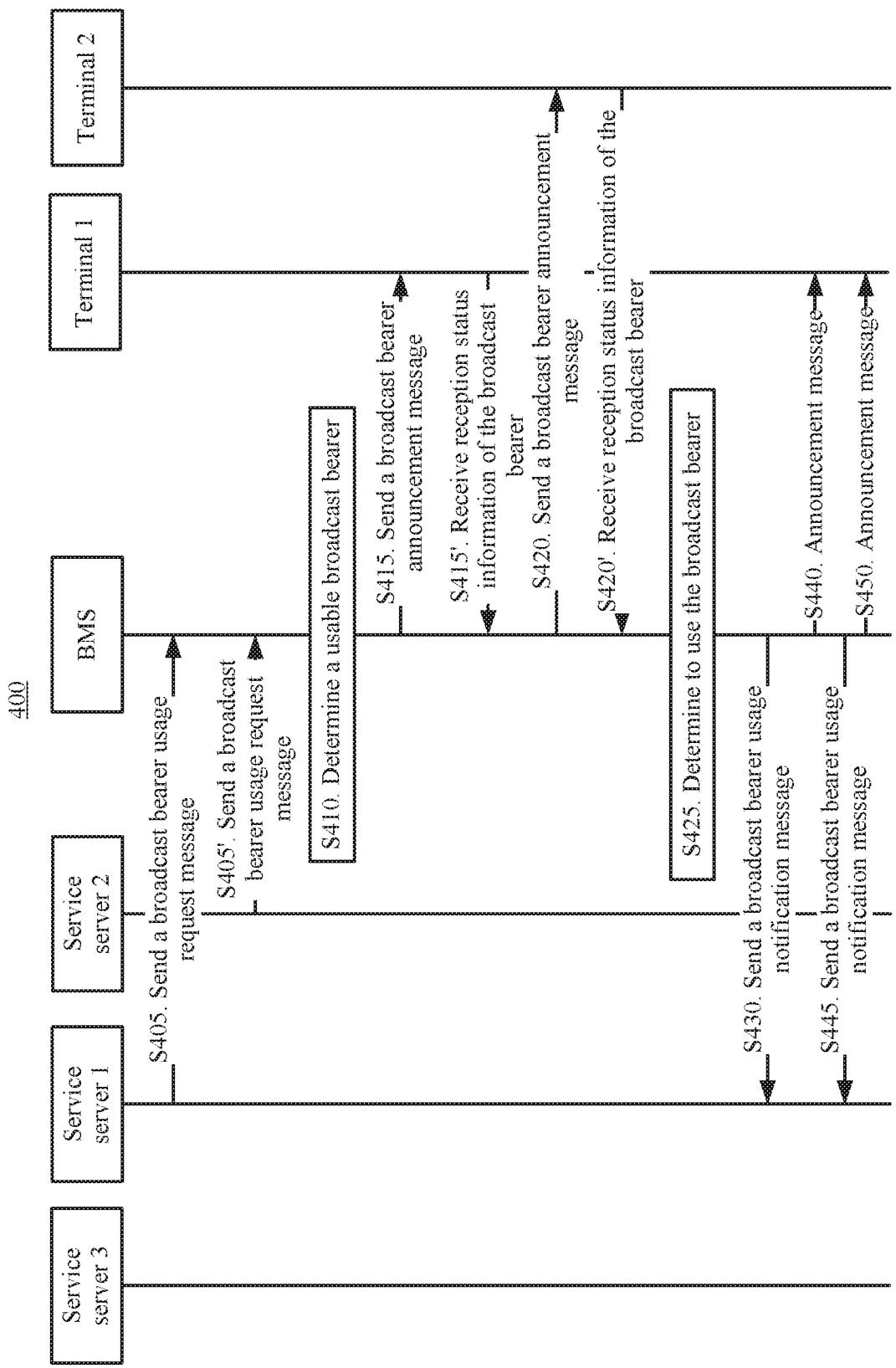
FIG. 13 is a flowchart of another MBMS bearer management method according to an embodiment of the present application.

FIG. 13 is a flowchart of another broadcast bearer management method according to an embodiment of the present application.

This embodiment describes that a participating MC service server requests to use a broadcast bearer. Each service group is related to one controlling MC service server and at least one participating MC service server. For media content of a same service group, if a downlink broadcast bearer is activated and used by the participating MC service server, an action process of each participating MC service server is the same as that of the controlling MC service server in the method 300 shown in FIG. 12A and FIG. 12B. A BMS receives broadcast bearer usage request messages about a same service group from a plurality of participating MC service servers.

This embodiment of the present application describes the BMS. The BMS ensures that in a same MC service system and in a same broadcast bearer service area, terminals of different participating MC service servers use a same broadcast bearer to receive downlink media data.

As shown in FIG. 13, the method 400 may include the following steps.

S405 and S405'. At least one service server that participates in same mission critical group communication sends a broadcast bearer usage request message to the BMS.

A service group session has been established. A participating MC service server 1 and a participating MC service server 2 that participate in group communication of a same service group belong to a same system.

The participating MC service server 1 and the participating MC service server 2 send broadcast bearer usage request messages to the BMS, where the messages include a group identifier of a same service group.

S410. The BMS requests, based on the broadcast bearer usage request message, a usable broadcast bearer for the at least one service server that participates in the mission critical group communication.

The BMS checks whether there is a usable broadcast bearer. If there is no usable broadcast bearer, the BMS establishes a broadcast bearer according to a requirement.

The process is the same as the process of S330, S335, S340, and S345 shown in FIG. 11. For brevity of description, details are not described herein again.

S415 and S420. The BMS sends a broadcast bearer announcement message to a terminal corresponding to the at least one service server that participates in the mission critical group communication.

The BMS sends broadcast bearer announcement (MBMS bearer announcement) messages to group members (or terminals) of the participating MC service server 1 and the participating MC service server 2. The broadcast bearer announcement message carries bearer information of a broadcast bearer, and is used to notify the bearer information of the broadcast bearer to the terminal. After receiving the message, the terminal (MC service client) stores the received bearer information of the broadcast bearer. The bearer information of the broadcast bearer includes one or more TMGIs, a service area, and other information related to the broadcast bearer. The terminal starts to monitor channel quality of the broadcast bearer corresponding to the one or more TMGIs, and determines whether data on the broadcast bearer can be received. When entering an MBMS service area or detecting, in the service area, that data can be received on a broadcast bearer corresponding to at least one TMGI, the terminal reports reception status information of the broadcast bearer to the BMS. The reception status information is used by the BMS as reference information to determine whether a broadcast transmission mode can be used for a service group.

It should be noted that, if there is a broadcast bearer, for example, a pre-established broadcast bearer, on the BMS, steps S415 and S420 may be performed before step S405.

S415' and S420'. The terminal sends received reception status information of the broadcast bearer to the BMS.

S425. The BMS determines to use the broadcast bearer.

The BMS determines, based on a broadcast bearer usage request message sent by the service server that participates in the mission critical group communication, a broadcast bearer to be used for the service group carried in the broadcast bearer usage request message.

A specific process of determining the broadcast bearer is the same as the process of S220 in the method 200 in FIG. 8, S222 in FIG. 10, S270 in FIG. 11, or S365 in the method 300 in FIG. 12A and FIG. 12B. For brevity of description, details are not described herein again.

S430. The BMS sends user plane information of the determined broadcast bearer to the service server.

In this embodiment of the present application, a process of S430 and S445 and a process of S440 and S450 are the same as the process of S370 and S375 in the method 300 shown in FIG. 12A and FIG. 12B. According to the technical solution in this embodiment, when at least one participating MC service server requests the BMS to use a broadcast bearer for a same group, the BMS may ensure that different service servers use a same broadcast bearer for a same service group.

Figure 14:
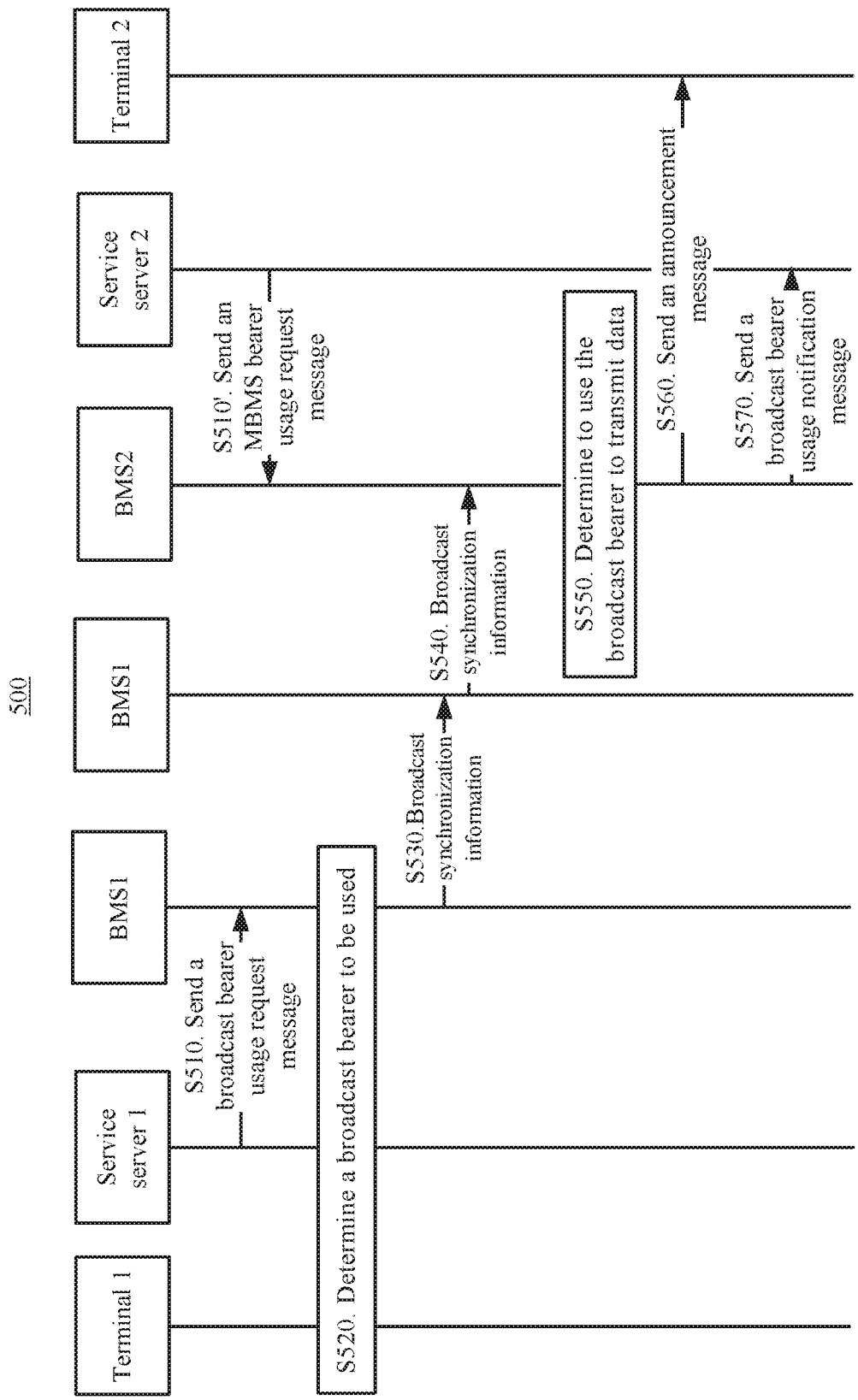
FIG. 14 is a flowchart of another broadcast bearer management method according to an embodiment of the present application.

FIG. 14 is a flowchart of another broadcast bearer management method according to an embodiment of the present application.

This embodiment of the present application describes a BMS. The BMS ensures that in different MC service systems and in a same MBMS service area, users of different participating MC service servers use a same broadcast bearer to receive downlink media data. In this embodiment, information about a used broadcast bearer is sent to BMSs in all partner systems by a controlling MC service server in a system defined by a service group or a BMS in the system defined by the group. In brief, for different BMS systems, in a same service area, a same broadcast bearer is used for different service groups.

As shown in FIG. 14, the method 500 includes the following steps.

S510 and S510'. BMSs in different systems each receive a broadcast bearer usage request message.

A service group session has been established. A participating MC service server 1 and a participating MC service server 2 that participate in same service group communication belong to different systems. The participating MC service server 1 belongs to a primary system. The participating MC service server 2 belongs to a partner system.

The participating MC service server 1 sends a broadcast bearer usage request message to a BMS 1 in the system to which the participating MC service server 1 belongs. The participating MC service server 2 sends a broadcast bearer usage request message to a BMS 2 in the system to which the participating MC service server 2 belongs. The broadcast bearer usage request messages may include a group identifier of a same service group.

S520. The BMS 1 determines a broadcast bearer to be used for a group that performs service group communication. The BMS 1 in the primary system determines to use the broadcast bearer for the service group. For a specific implementation process, refer to S365 in the method 300 shown in FIG. 12A and FIG. 12B and S425 in the method 400 shown in FIG. 13. For brevity of description, details are not described herein again.

S530. The BMS 1 sends broadcast synchronization information to a BMS in another system. The BMS in another system is a BMS that is in the same system as a controlling MC service server. After the primary system uses a broadcast bearer to transmit data for the service group, bearer information needs to be notified to another participating MC service server. Because the BMS that is in the same system as the controlling MC service server definitely has all information about the group, the BMS in the primary system sends the broadcast synchronization information (synchronize MBMS bearer information) to the BMS that is in the same system as the controlling MC service server. The broadcast synchronization information may include bearer information and user plane information of the broadcast bearer. Optionally, the broadcast synchronization information further includes a group identifier of the service group.

S540. The BMS sends the broadcast synchronization information to the BMS 2.

After receiving a broadcast bearer synchronization message, the BMS that is in the same system as the controlling MC service server sends the bearer information and the user plane information of the broadcast bearer to a BMS, in the partner system, that participates in the same service group communication.

S550. After receiving the broadcast bearer synchronization information, the BMS 2 determines to use the broadcast bearer for the group that performs the service group communication.

S560. The BMS notifies received bearer information of the broadcast bearer to a terminal in the service group that participates in the service group communication in a partner system.

S570. The BMS notifies received user plane information of the broadcast bearer to a participating MC service server that participates in the service group communication in the partner system.

A process of S550, S560, and S570 is the same as a process of S375 and S370 in the method 300 shown in FIG. 12A and FIG. 12B and a process of S435 and S450, or S430 and S445 in the method 400 in FIG. 13. For brevity of description, details are not described herein again.

In this embodiment, information about a used broadcast bearer is sent to BMSs of all partner systems by a controlling MC service server in a system defined by a group or a BMS in the system defined by the group, to ensure that in different MC service systems, in a same broadcast service area, users of different participating MC service servers use a same broadcast bearer to receive downlink data of same service group communication.

It should be noted that the steps of the methods in FIG. 12A and FIG. 12B to FIG. 16 are the same as the corresponding methods/steps in FIG. 8 to FIG. 10.

Figure 15:
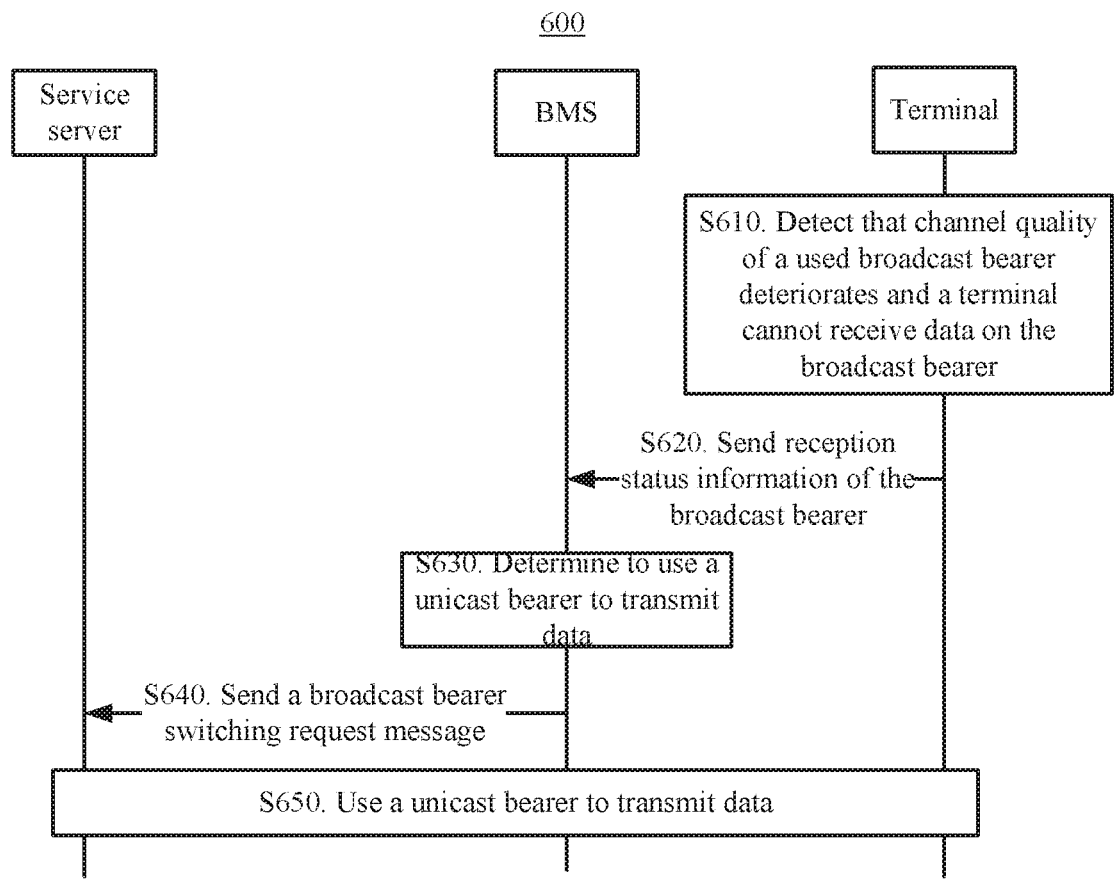
FIG. 15 is a flowchart of another broadcast bearer management method according to an embodiment of the present application.

FIG. 15 is a flowchart of another broadcast bearer management method according to an embodiment of the present application.

This embodiment describes that a BMS controls an MC service client to switch from a broadcast bearer to a unicast bearer.

As shown in FIG. 15, the method 600 includes the following steps.

S610. A terminal detects that channel quality of a used broadcast bearer deteriorates and the terminal cannot receive data on the broadcast bearer.

S620. The BMS receives reception status information of the broadcast bearer sent by the terminal.

The reception status information of the broadcast bearer indicates that the terminal cannot receive data on the broadcast bearer.

S630. If the reception status information of the broadcast bearer satisfies a preset condition, the BMS determines to use a unicast bearer to transmit data.

The preset condition may be determining that the reception status information of the broadcast bearer is "data cannot be received".

S640. The BMS sends a broadcast bearer switching request message to a service server.

The broadcast bearer switching request message includes an identifier of a terminal that sends status information, not satisfying the preset condition, of the broadcast bearer. The broadcast bearer switching request message is used to request the service server to switch to a unicast bearer to transmit data to the terminal corresponding to the identifier of the terminal.

S650. The service server uses, based on the broadcast bearer switching request message, a unicast bearer to transmit data to the terminal corresponding to an identifier of the terminal.

The terminal receives data sent by the service server.

Specifically, a service group has ongoing service group communication before S610. A broadcast bearer is used to transmit media data in a specific broadcast service area. The terminal can receive data on the broadcast bearer in the specific broadcast bearer area.

An MC service client detects an undesirable status in which the MC service client receives data on a broadcast bearer or the MC service client cannot receive data on a broadcast bearer, that is, the preset condition is not satisfied, and the MC service client reports, to the BMS, that the reception status information of the broadcast bearer is "data cannot be received". The BMS determines, based on the reception status information, indicating "data cannot be received", of the broadcast bearer, to trigger an MC service server to use a unicast bearer to transmit media data for the MC service client.

The BMS sends a unicast bearer switching request message to the MC service server. The message carries an identifier of a client. Optionally, the message may further carry a group identifier of the service group. The MC service server uses a unicast bearer to send downlink media data of the service group to the MC service client.

In this embodiment of the present application, a broadcast bearer is used to send downlink media data for the service group in a specific broadcast bearer service area. If an MC service client cannot receive data on the broadcast bearer, a report is sent to the BMS, and the BMS triggers the MC service server to send downlink data to the user in a unicast manner, to improve system performance.

Figure 16:
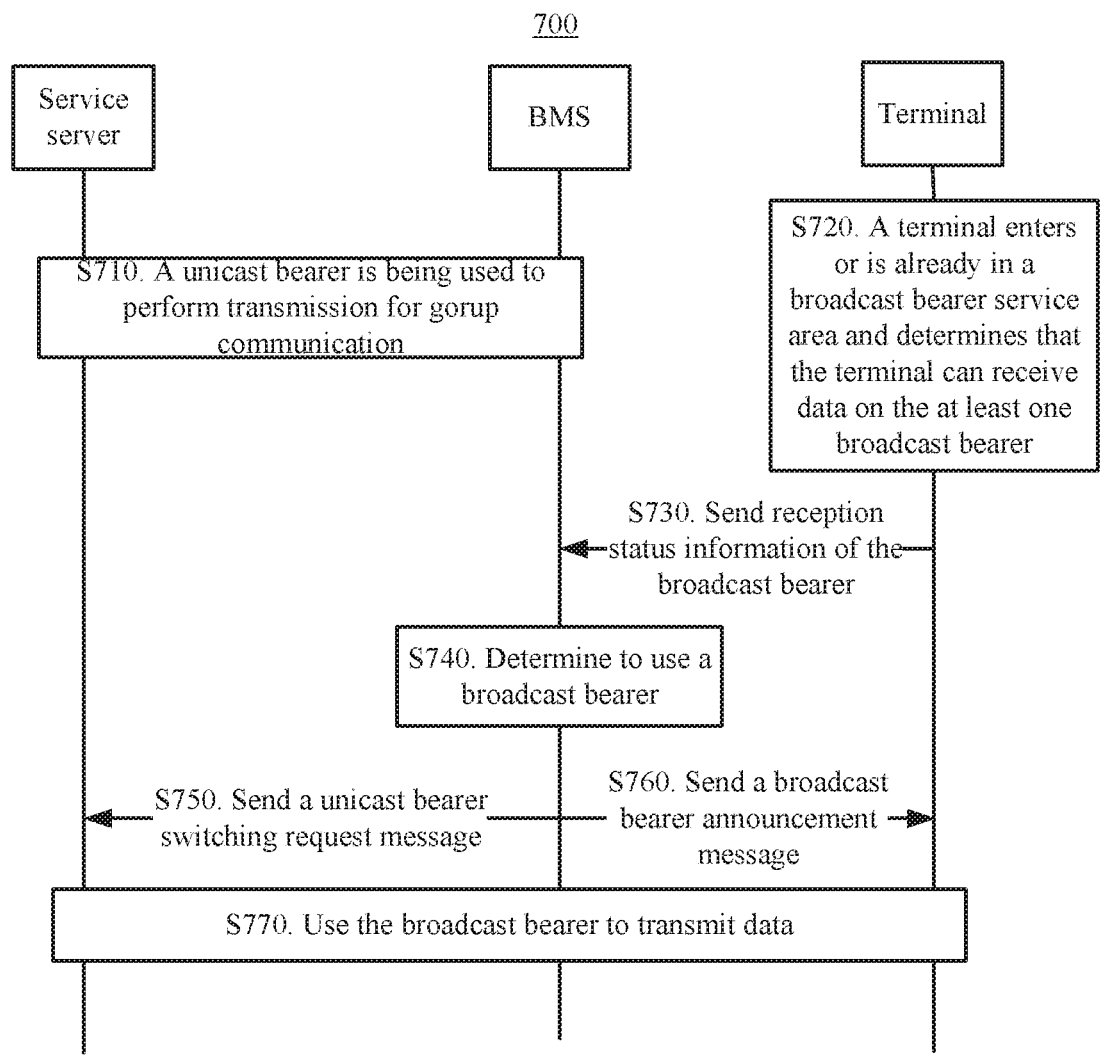
FIG. 16 is a flowchart of another broadcast bearer management method according to an embodiment of the present application.

FIG. 16 is a flowchart of another broadcast bearer management method according to an embodiment of the present application.

This embodiment describes that a BMS controls service group communication to switch from unicast bearer transmission to broadcast bearer transmission.

An MC service client in the following steps is a terminal in FIG. 16.

As shown in FIG. 16, the method 700 includes the following steps.

S710. Currently, a service group is using a unicast bearer to transmit group communication data.

After the service group sends a first message to the BMS to request a usable broadcast bearer and the BMS receives the first message, if no usable broadcast bearer can be determined based on that a received reception status of at least one broadcast bearer sent by at least one MC service client does not satisfy a first preset condition, a service server uses a unicast bearer to transmit data.

S720. An MC service client enters or is already in a broadcast service area and determines that the MC service client can receive data on at least one broadcast bearer.

The MC service client previously cannot receive data on the at least one broadcast bearer. A process in which the MC service client determines that data on the broadcast bearer is received is the same as that described above. S730. The MC service client sends reception status information of the broadcast bearer.

S740. A BMS determines, based on a received reception status information of the at least one broadcast bearer sent by at least one MC service client, to use a first broadcast bearer for the service group.

S750. The BMS sends a unicast bearer switching request message to a service server.

The unicast bearer switching request message includes user plane information of a broadcast bearer determined by the BMS. The unicast bearer switching request message is used to request the service server to use a broadcast bearer to perform transmission for a group communication service.

In a possible implementation, after receiving the message, the service server uses the broadcast bearer to transmit group communication data and stops using an original unicast bearer to transmit group communication data to the MC service client in the group.

In another possible implementation, the unicast bearer switching request message further includes a list of MC service clients of a group. After receiving the message, the service server uses the broadcast bearer to transmit group communication data and stops using the original unicast bearer to transmit group communication data to an MC service client, in the group, other than the MC service clients in the list.

S760. The BMS sends bearer information of the first broadcast bearer to an MC service client in the group. The message includes the bearer information of the first broadcast bearer.

Optionally, the message further includes a group identifier of the service group.

The message is used to instruct the MC service client to receive communication data of the service group on the first broadcast bearer.

The BMS sends the unicast bearer switching request message to an MC service server. The message carries the user plane information of the first broadcast bearer determined by the BMS. The MC service server uses a broadcast bearer to send downlink media data to the MC service client. To avoid a data loss, within a period of time, the MC service server may use both a broadcast bearer and a unicast bearer to deliver media data. S770. The service server uses the broadcast bearer to transmit data.

Figure 17:
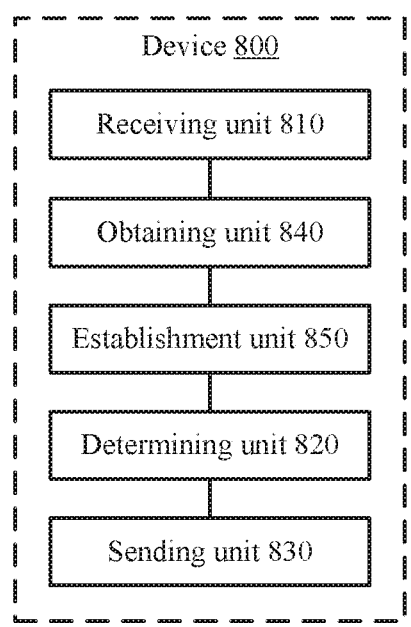
FIG. 17 is a schematic structural diagram of a broadcast bearer management device according to an embodiment of the present application.

FIG. 17 is a schematic structural diagram of a broadcast bearer management device according to an embodiment of the present application. The broadcast bearer management device is configured to implement the steps performed by a first bearer management server BMS in the embodiments shown in FIG. 8 to FIG. 16. As shown in FIG. 16, the broadcast bearer management device 800 includes a receiving unit 810, a determining unit 820, and a sending unit 830.

The receiving unit 810 is configured to receive a first message sent by a service server, where the first message includes a group identifier of a service group.

The determining unit 820 is configured to determine a first broadcast bearer for the service group based on the first message.

The sending unit 830 is configured to send a second message to the service server, where the second message carries user plane information of the first broadcast bearer.

According to the broadcast bearer management device provided in this embodiment of the present application, the first message sent by the service server is received, a usable broadcast bearer is determined for the service group based on the group identifier of the service group included in the first message, the user plane information of the determined broadcast bearer is added to the second message and sent to the service server, where optionally, the second message further carries the group identifier of the group, so that the service server may use the broadcast bearer to transmit data for the group. A broadcast bearer management function is decoupled from an application service layer control function. In addition, compared with the prior art, broadcast bearers are centrally managed and used at one control point, so that the broadcast bearers are centrally scheduled.

Optionally, in another embodiment of the present application, the broadcast bearer management device 800 may further include an obtaining unit 840, where the obtaining unit 840 is configured to obtain reception status information of at least one broadcast bearer sent by at least one terminal.

The determining unit 820 is specifically configured to determine the first broadcast bearer for the service group based on the first message and the reception status information of the at least one broadcast bearer sent by the at least one terminal.

The first message further includes service description information, and the determining unit 820 is specifically configured to:

determine the first broadcast bearer for the service group if the at least one broadcast bearer satisfies the service description information and the reception status information of the at least one broadcast bearer sent by the at least one terminal satisfies a first preset condition.

Optionally, in another embodiment of the present application, the broadcast bearer management device 800 may further include an establishment unit 850, where the establishment unit 850 is configured to establish the first broadcast bearer based on the first message.

The sending unit 830 is further configured to send a broadcast bearer announcement message to at least one terminal, where the broadcast bearer announcement message carries bearer information of the first broadcast bearer.

The receiving unit 810 is further configured to receive reception status information of the first broadcast bearer sent by the at least one terminal.

The determining unit 820 is specifically configured to: if the reception status information of the first broadcast bearer sent by the at least one terminal satisfies a first preset condition, determine the first broadcast bearer for the service group.

In another embodiment of the present application, the obtaining unit 840 is further configured to obtain reception status information of at least one broadcast bearer sent by the at least one terminal.

If the reception status information of the at least one broadcast bearer sent by the at least one terminal does not satisfy the first preset condition, the establishment unit 850 establishes the first broadcast bearer based on the first message.

If the first message includes service description information, the establishment unit 850 is specifically configured to:

if the service description information does not satisfy a second preset condition, establish the first broadcast bearer based on the first message.

Optionally, in another embodiment of the present application, the first BMS establishes the first broadcast bearer based on the first message, and the obtaining unit 840 is further configured to obtain location information of a terminal in the service group.

The establishment unit 850 is specifically configured to establish the first broadcast bearer based on the service description information and the location information of the terminal in the service group.

The obtaining unit 840 is specifically configured to: obtain the location information of the terminal in the service group from at least one of the service server, a group management server, a terminal location management server, and a second BMS; or receive the location information sent by the terminal in the service group.

Optionally, the sending unit 830 is further configured to send a broadcast bearer synchronization message to the second BMS, where the broadcast bearer synchronization message includes the bearer information and the user plane information of the first broadcast bearer.

The receiving unit 810 is further configured to receive the reception status information of the first broadcast bearer sent by a terminal in the service group.

If the reception status information of the first broadcast bearer sent by the terminal does not satisfy a third preset condition, the sending unit 830 is further configured to send a third message to the service server, where the third message carries an identifier of the terminal, and the third message is used to request the service server to send media data to the terminal by using a unicast bearer.

It should be noted that the units in the broadcast bearer management device 800 provided in FIG. 17 may separately perform the methods/steps in FIG. 8 to FIG. 16. For brevity of description, details are not described herein again.

It should be further noted that the determining unit 820, the obtaining unit 840, and the establishment unit 850 in FIG. 17 may be collectively referred to as a processing unit.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms. The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments of the present application. In addition, functional units in the embodiments of the present application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely specific implementations of the present application, but are not intended to limit the protection scope of the present application. Any modification or replacement figured out by a person skilled in the art within the technical scope disclosed in the present application shall fall within the protection scope of the present application. Therefore, the protection scope of the present application shall be subject to the protection scope of the claims.

What is claimed is:

1. A broadcast bearer management method, comprising:
   sending, by a second server, a first message to a first bearer management server, wherein the first message comprises a group identifier of a service group;
   establishing, by the first bearer management server, a first broadcast bearer based on the first message;
   sending, by the first bearer management server, a broadcast bearer announcement message to at least one terminal, wherein the broadcast bearer announcement message carries bearer information of the first broadcast bearer;
   receiving, by the first bearer management server, reception status information of the first broadcast bearer from the at least one terminal;
   determining, by the first bearer management server according to the reception status information of the first broadcast bearer, the first broadcast bearer for the service group; and
   sending, by the first bearer management server, a second message to the second server, wherein the second message carries user plane information of the first broadcast bearer.

2. The method according to claim 1, wherein the method further comprises:
   receiving, by the second server, the second message; and
   sending, by the second server, data to a member in the service group by using the first broadcast bearer.

3. The method according to claim 1, wherein the method further comprises:
   sending, by the first bearer management server, transmission mode indication information to the second server.

4. The method according to claim 3, wherein:
   the transmission mode indication information instructs the second server to use a broadcast transmission mode for the service group; or
   the transmission mode indication information instructs the second server to:
     switch from a unicast transmission mode to a broadcast transmission mode; or
     switch from a broadcast transmission mode to a unicast transmission mode.

5. The method according to claim 1, wherein the determining, by the first bearer management server according to the reception status information of the first broadcast bearer, the first broadcast bearer for the service group, comprising:
   determining, by the first bearer management server, that the reception status information of the first broadcast bearer satisfies a first preset condition.

6. The method according to claim 5, wherein the first preset condition comprises: a quantity of terminals that can receive data on the first broadcast bearer reaches a preset value.

7. The method according to claim 1, wherein the reception status information is a status indication indicating that data can be received, or data cannot be received.

8. The method according to claim 1, wherein the user plane information of the first broadcast bearer comprises an IP address and a port number of a user-plane broadcast multicast-service center (BM-SC).

9. The method according to claim 1, wherein the bearer information of the first broadcast bearer comprises at least one of:
   a temporary mobile group identity (TMGI) of the first broadcast bearer; or
   a radio frequency and a multimedia broadcast/multicast service (MBMS) service area identifier.

10. A non-transitory computer readable storage medium comprising instructions which, when executed by one or more processors, cause the one or more processors to perform operations comprising:
    receiving a first message from a second server, wherein the first message comprises a group identifier of a service group;
    establishing a first broadcast bearer based on the first message;
    sending a broadcast bearer announcement message to at least one terminal, wherein the broadcast bearer announcement message carries bearer information of the first broadcast bearer;
    receiving reception status information of the first broadcast bearer from the at least one terminal;
    determining, according to the reception status information of the first broadcast bearer, the first broadcast bearer for the service group; and
    sending a second message to the second server, wherein the second message carries user plane information of the first broadcast bearer.

11. The non-transitory computer readable storage medium according to claim 10, wherein the operations further comprises:
    sending transmission mode indication information to the second server.

12. The non-transitory computer readable storage medium according to claim 11, wherein:
    the transmission mode indication information instructs the second server to use a broadcast transmission mode for the service group; or
    the transmission mode indication information instructs the second server to:
      switch from a unicast transmission mode to a broadcast transmission mode; or
      switch from a broadcast transmission mode to a unicast transmission mode.

13. The non-transitory computer readable storage medium according to claim 10, wherein the determining, according to the reception status information of the first broadcast bearer, the first broadcast bearer for the service group comprises:

determining that the reception status information of the first broadcast bearer satisfies a first preset condition.

14. The non-transitory computer readable storage medium according to claim 13, wherein the first preset condition comprises: a quantity of terminals that can receive data on the first broadcast bearer reaches a preset value.

15. The non-transitory computer readable storage medium according to claim 10, wherein the reception status information is a status indication indicating that data can be received, or data cannot be received.

16. The non-transitory computer readable storage medium according to claim 10, wherein the bearer information of the first broadcast bearer comprises at least one of:
   a temporary mobile group identity (TMGI) of the first broadcast bearer; or
   a radio frequency and a multimedia broadcast/multicast service (MBMS) service area identifier.

17. A broadcast bearer management method, comprising:
   receiving, by a terminal, a broadcast bearer announcement message from a first bearer management server, wherein the broadcast bearer announcement message carries bearer information of a first broadcast bearer; and
   sending, by the terminal according to the bearer information of the first broadcast bearer, reception status information of the first broadcast bearer to the first bearer management server, wherein the reception status information is used for the first bearer management server determining a broadcast bearer for a service group and sending a second message carrying user plane information of the broadcast bearer for the service group to a second server.

18. The method according to claim 17, wherein the reception status information is a status indication indicating that data can be received, or data cannot be received.

19. An apparatus, comprising at least one processor and a memory, wherein the memory is configured to store a program for execution by the at least one processor, and wherein the program instructs the at least one processor to:
   receive a broadcast bearer announcement message from a first bearer management server, wherein the broadcast bearer announcement message carries bearer information of a first broadcast bearer; and
   send, according to the bearer information of the first broadcast bearer, reception status information of the first broadcast bearer to the first bearer management server, wherein the reception status information is used for the first bearer management server determining a broadcast bearer for a service group and sending a second message carrying user plane information of the broadcast bearer for the service group to a second server.

20. The apparatus according to claim 19, wherein the reception status information is a status indication indicating that data can be received, or data cannot be received.

* * * * *